US011999859B1

(12) United States Patent
Kang et al.

(10) Patent No.: US 11,999,859 B1
(45) Date of Patent: Jun. 4, 2024

(54) PREPARATION METHOD OF COPPER GREEN RUST PIGMENT THAT CAN REPLACE HAYEOB PIGMENT IN TRADITIONAL DANCHEONG

(71) Applicant: National Research Institute of Cultural Heritage, Daejeon (KR)

(72) Inventors: Yeong Seok Kang, Daejeon (KR); Sun Myung Lee, Daejeon (KR); Ju Hyun Park, Daejeon (KR); Seong Woo Mun, Daejeon (KR)

(73) Assignee: National Research Institute of Cultural Heritage, Daejeon (KR)

( * ) Notice: Subject to any disclaimer, the term of this patent is extended or adjusted under 35 U.S.C. 154(b) by 0 days.

(21) Appl. No.: 18/450,965

(22) Filed: Aug. 16, 2023

(30) Foreign Application Priority Data

Apr. 18, 2023 (KR) .................. 10-2023-0050520

(51) Int. Cl.
| | | |
|---|---|---|
| *C09C 1/62* | (2006.01) | |
| *B22F 1/145* | (2022.01) | |
| *B22F 9/04* | (2006.01) | |
| *C09C 3/00* | (2006.01) | |
| *C09C 3/04* | (2006.01) | |
| *C09C 3/06* | (2006.01) | |

(Continued)

(52) U.S. Cl.
CPC .............. *C09C 1/627* (2013.01); *B22F 1/145* (2022.01); *B22F 9/04* (2013.01); *C09C 1/622* (2013.01); *C09C 3/006* (2013.01); *C09C 3/041* (2013.01); *C09C 3/06* (2013.01); *C22C 9/02* (2013.01); *C22C 9/04* (2013.01); *B22F 2301/10* (2013.01); *B22F 2998/10* (2013.01); *B22F 2999/00* (2013.01); *C01P 2002/72* (2013.01); *C01P 2004/03* (2013.01); *C01P 2006/63* (2013.01)

(58) Field of Classification Search
None
See application file for complete search history.

(56) References Cited

U.S. PATENT DOCUMENTS 4,097,300 A  6/1978 Balducci et al.

FOREIGN PATENT DOCUMENTS

| | | |
|---|---|---|
| JP | 2010150087 | 7/2010 |
| KR | 1019957000967 | 2/1995 |
| KR | 101665258 | 10/2016 |

OTHER PUBLICATIONS

Notice of Allowance dated May 30, 2023, in corresponding KR Patent Application No. 10-2023-0050520.

(Continued)

*Primary Examiner* — Colin W. Slifka
(74) *Attorney, Agent, or Firm* — Leydig, Voit & Mayer, Ltd.

(57) ABSTRACT

The present invention relates to a preparation method of a copper green rust pigment, particularly a preparation method of a copper green rust pigment that can replace the traditional Dancheong Hayeob pigment comprising the following steps: a step of preparing a copper powder comprising at least one of copper; and a copper alloy comprising copper and at least one of tin (Sn), zinc (Zn), and lead (Pb); and a step of corroding the copper powder by mixing the copper powder with a corrosive agent containing sodium chloride and ammonium chloride. The corrosive agent includes 75 to 90 weight % of the sodium chloride and 10 to 25 weight % of the ammonium chloride based on the total weight.

7 Claims, 31 Drawing Sheets
(18 of 31 Drawing Sheet(s) Filed in Color)

(51) Int. Cl.
C22C 9/02 (2006.01)
C22C 9/04 (2006.01)

(56) References Cited

OTHER PUBLICATIONS

Oh et al. (2020) "Review of Copper Trihydroxychloride, a Green Pigment Composed of Copper and Chlorine," Munhwajae, 53(2), pp. 64-87.
The Study on Reappearance and Characteristics of Green Inorganic Pigment(Yongin University Master's Thesis, Date of Publication: Feb. 2012).

Corrosive agents : NA11,
Copper powder:Corrosive agents = 1:2

Before artificial corrosion

|    | NA10 | NA01 | NA11 | NA21 | NA12 |
|----|------|------|------|------|------|
| CU |      |      |      |      |      |
| CS |      |      |      |      |      |
| CZ |      |      |      |      |      |
| CP |      |      |      |      |      |
| CT |      |      |      |      |      |

Fig. 3

After artificial corrosion

Copper powder: CU

| Cycle | NA10 | NA01 | NA11 | NA21 | NA12 |
|---|---|---|---|---|---|
| 0 | | | | | |
| 1 | | | | | |
| 3 | | | | | |
| 5 | | | | | |
| 7 | | | | | |
| 9 | | | | | |
| 11 | | | | | |

Fig. 6

Copper powder: CS

| Cycle | NA10 | NA01 | NA11 | NA21 | NA12 |
|---|---|---|---|---|---|
| 0 | | | | | |
| 1 | | | | | |
| 3 | | | | | |
| 5 | | | | | |
| 7 | | | | | |
| 9 | | | | | |
| 11 | | | | | |

Fig. 7

Copper powder:CZ

| Cycle | NA10 | NA01 | NA11 | NA21 | NA12 |
|---|---|---|---|---|---|
| 0 | | | | | |
| 1 | | | | | |
| 3 | | | | | |
| 5 | | | | | |
| 7 | | | | | |
| 9 | | | | | |
| 11 | | | | | |

Fig. 8

Copper powder:CP

| Cycle | NA10 | NA01 | NA11 | NA21 | NA12 |
|---|---|---|---|---|---|
| 0 | | | | | |
| 1 | | | | | |
| 3 | | | | | |
| 5 | | | | | |
| 7 | | | | | |
| 9 | | | | | |
| 11 | | | | | |

Fig. 9

Copper powder: CT

| Cycle | NA10 | NA01 | NA11 | NA21 | NA12 |
|---|---|---|---|---|---|
| 0 | ● | ● | ● | ● | ● |
| 1 | ● | ● | ● | ● | ● |
| 3 | ● | ● | ● | ● | ● |
| 5 | ● | ● | ● | ● | ● |
| 7 | ● | ● | ● | ● | ● |
| 9 | ● | ● | ● | ● | ● |
| 11 | ● | ● | ● | ● | ● |

Fig. 10

| N:A | CU | CS | CZ | CP | CT |
|---|---|---|---|---|---|
| 3:1 | | | | | |
| 4:1 | | | | | |
| 9:1 | | | | | |
| 19:1 | | | | | |

Fig. 12

| No. | Corrosive agents ratio | | Corrosive agents ratio(%) | | The color of the manufactured pigment | | | | |
|---|---|---|---|---|---|---|---|---|---|
| | NaCl | NH₄Cl | NaCl | NH₄Cl | CU | CS | CZ | CP | CT |
| 5 | 3 | 1 | 75 | 25 | | | | | |
| 6 | 4 | 1 | 80 | 20 | | | | | |
| 7 | 5 | 1 | 83 | 17 | | | | | |
| 8 | 6 | 1 | 86 | 14 | | | | | |
| 9 | 9 | 1 | 90 | 10 | | | | | |

PREPARATION METHOD OF COPPER GREEN RUST PIGMENT THAT CAN REPLACE HAYEOB PIGMENT IN TRADITIONAL DANCHEONG

CROSS-REFERENCE TO RELATED APPLICATIONS

This patent application claims the benefit of priority from Korean Patent Application No. 10-2023-0050520 filed on Apr. 18, 2023, the contents of which are incorporated herein by reference.

BACKGROUND OF THE INVENTION

1. Field of the Invention

The present invention relates to a preparation method of a copper green rust pigment.

2. Description of the Related Art

Since ancient times, humans have used pigments of various colors to express beauty in artworks such as paintings, murals or Dancheong (traditional multicolored paintwork on wooden buildings) of buildings. Traditionally used pigments are mainly made using natural soil and rocks, but artificial pigments, which are synthetically made from metals such as mercury, lead, and copper, have also been reported as major coloring materials.

Traditional artificial pigments include Eunju (vermilion), Yeonbak (lead white), Yeondan (lead red), Dongrok (copper green rust), and Hoecheong (smalt), of which Dongrok (copper green rust) is known as a green pigment primarily composed of copper oxide. In addition, there is a green pigment Hayeob that has been used as a traditional green pigment not only in traditional Dancheong of cultural heritages but also in gwaebul (large Buddhist hanging scrolls), temple murals, and paintings, and is often mentioned in Korean ancient literature records. However, it is known only as a dark green color in the literature, but there are no records to identify its composition or characteristics, and it is not clear whether it is a natural pigment collected from nature or an artificial pigment synthesized and manufactured. However, according to the results of pigment analysis studies conducted on domestic painting cultural heritages, it is suggested that the Hayeob pigment consists primarily of copper (Cu) and chlorine (Cl) as major components, and the analysis of particle morphology indicates that it is likely an artificially synthesized Dongrok (copper green rust) pigment.

In ancient Asian literature such as Cheon-Gong-Gae-Mul (天工開物), Boncho-Gang-Mok (本草綱目), and Imwon-Gyeongje-Ji (林園經濟志), it is possible to confirm the method of manufacturing Dongrok (copper green rust pigment) by reacting a copper plate with vinegar. Kang et al. (2020) conducted a study to manufacture and characterize the copper green rust pigment by applying an acid corrosion method that corrodes a copper plate using acetic acid. According to the research results, copper produced by the acid etching method exhibited a polygonal particle shape and has a copper acetate or copper carbonate structure. In addition, hoganite [$Cu(CH_3COO)_2 \cdot H_2O$], which has a monoclinic crystal structure as a copper-based secondary product, was identified as the main constituent mineral. In the study of pigment analysis on painting cultural heritages in Korea, only malachite [$Cu_2CO_3(OH)_2$], atakamite [$Cu_2Cl(OH)_3$], and botallackite [$Cu_2Cl(OH)_3$] were reported, but hoganite was never reported, suggesting the possibility of a pigment different from that used in painting cultural heritages.

On the other hand, according to the results of the investigation of old literature records, the manufacturing method of Dongrok (copper green rust) include not only an acid corrosion method that corrodes a copper plate using vinegar, but also a chloride corrosion method that uses chlorine (Cl) compounds or a combination of vinegar and chlorine compounds. This can be found in the ancient literature, Shinsu Boncho (新修本 草), which is described as a method of mixing copper powders with a corrosive agent (sodium chloride, ammonium chloride) and then naturally corroding thereof, but there is no detailed description. Furthermore, since there are not many literature records related to the chloride corrosion method, there is a need for further research on the manufacturing methods for reproducing Dongrok (copper green rust) (see Oh et al., 2020, Review of Copper Trihydroxychloride, a Green Pigment Composed of Copper and Chlorine. MUNHWAJAE, 53(2), pp. 64~87).

Accordingly, the present inventors investigated old literature records and research data to manufacture Dongrok (copper green rust) pigment that can replace the traditional Dancheong Hayeob pigment, have explored the conditions necessary for securing the manufacturing technology based on this, and produced a copper green rust pigment by applying the secured manufacturing technology and completed this invention.

SUMMARY OF THE INVENTION

It is an object of the present invention to provide a preparation method of a copper green rust pigment.

To achieve the above object, in one aspect of the present invention, the present invention provides a preparation method of a copper green rust pigment that can replace the traditional Dancheong Hayeob pigment comprising the following steps:
- a step of preparing a copper powder comprising at least one of copper; and a copper alloy comprising copper and at least one of tin (Sn), zinc (Zn), and lead (Pb); and
- a step of corroding the copper powder by mixing the copper powder with a corrosive agent containing sodium chloride and ammonium chloride, in which the corrosive agent includes 75 to 90 weight % of the sodium chloride and 10 to 25 weight % of the ammonium chloride based on the total weight.

At this time, the corrosive agent can include 86 to 90 weight % of the sodium chloride and 10 to 14 weight % of the ammonium chloride based on the total weight.

In the step of corroding above, the copper powder and the corrosive agent can be mixed in a weight ratio of 1:2 or higher.

The corrosion can be performed by artificial corrosion using a corrosion tester.

The preparation method of a copper green rust pigment may further include a step of pulverizing and wet fractionating the corrosion product prepared in the step of corroding.

The preparation method of a copper green rust pigment may further include a step of removing the residual corrosive agent by mixing the pulverized and wet fractionated powder with distilled water and removing the supernatant.

The preparation method of a copper green rust pigment may further include a step of purifying the powder from which the residual corrosive agent has been removed.

In another aspect of the present invention, the present invention provides a copper green rust pigment that is prepared using the preparation method above.

The copper green rust pigment can be a green pigment for traditional coloring.

The present invention has significant advantages as it provides a copper green rust pigment that can replace Hayeob, the traditional green pigment that has been widely used in various painting cultural heritages such as Dancheong, Buddhist paintings, temple murals, and Joseon Dynasty portraits.

The preparation method of the present invention can be extended and applied to various painting cultural heritages, and can also greatly contribute to continuing traditional technology by becoming a stepping stone for research on alternative pigments for expensive natural pigments that are required internally and externally.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a set of photographs showing the results of observing the colors of the pigments before artificial corroding the copper powders (CU, CS, CZ, CP, and CT) of Preparative Examples 1 to 5 by mixing with a corrosive agent.

FIGS. 6 to 10 are photographs showing the results of observing the colors of the pigments prepared by varying the artificial corrosion period of the copper powders (CU, CS, CZ, CP, and CT) of Preparative Examples 1 to 5.

FIG. 12 is a set of photographs showing the results of observing the colors of the pigments prepared by artificial corrosion of the copper powders (CU, CS, CZ, CP, and CT) of Preparative Examples 1 to 5, wherein the ratio of sodium chloride and ammonium chloride in the corrosive agent is 3:1, 4:1, 9:1, and 19:1.

DETAILED DESCRIPTION OF THE INVENTION

Figure 1:
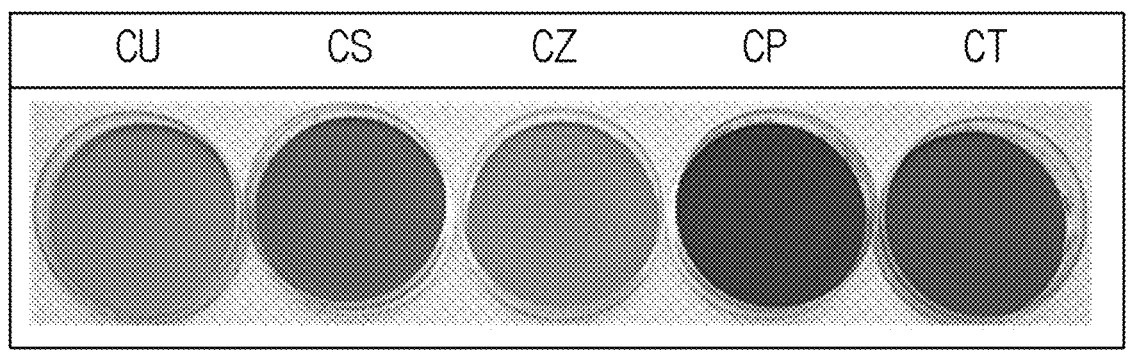
FIG. 1 is a set of photographs showing the results of observing the copper powders (CU, CS, CZ, CP, and CT) of Preparative Examples 1 to 5.

Hereinafter, the preferred embodiments of the present invention will be described. However, the embodiments of this invention can be modified in various other forms, and the scope of the present invention is not limited to the embodiments described below. It is well understood by those in the art who has the average knowledge on this field that the embodiments of the present invention are given to explain the present invention more precisely. In addition, the "inclusion" of an element throughout the specification does not exclude other elements, but may include other elements, unless specifically stated otherwise.

In one aspect of the present invention, the present invention provides a preparation method of a copper green rust pigment that can replace the traditional Dancheong Hayeob pigment comprising the following steps:

a step of preparing a copper powder comprising at least one of copper; and a copper alloy comprising copper and at least one of tin (Sn), zinc (Zn), and lead (Pb); and a step of corroding the copper powder by mixing the copper powder with a corrosive agent containing sodium chloride and ammonium chloride, in which the corrosive agent includes 75 to 90 weight % of the sodium chloride and 10 to 25 weight % of the ammonium chloride based on the total weight.

Hereinafter, the preparation method of a copper green rust pigment according to an embodiment will be described in detail step by step.

The preparation method of a copper green rust pigment according to an embodiment is a method of manufacturing a copper green rust pigment using a traditional chlorine corrosion method.

In the preparation method of a copper green rust pigment according to an embodiment, a step of preparing a copper powder comprising at least one of copper; and a copper alloy comprising copper and at least one of tin (Sn), zinc (Zn), and lead (Pb) is performed.

At this time, the copper powder may be pure copper, or may be a copper alloy comprising copper and at least one of tin (Sn), zinc (Zn), and lead (Pb).

For example, the copper alloy is an alloy of copper and tin (Sn), and may include 70 to 80 weight % of copper (Cu) and 20 to 30 weight % tin (Sn). In addition, the copper alloy is an alloy of copper (Cu) and zinc (Zn), and may include 75 to 85 weight % of copper (Cu) and 25 to 35 weight % of zinc (Zn). In addition, the copper alloy is an alloy of copper (Cu), tin (Sn), and zinc (Zn), and may include 75 to 85 weight % of copper (Cu), and 5 to 15 weight % of each of tin (Sn) and zinc (Zn). In addition, the copper alloy is an alloy of copper (Cu), tin (Sn), zinc (Zn) and lead (Pb), and may include 80 to 90 weight % of copper (cu), and 3 to 7 weight % of each of tin (Sn), zinc (Zn) and lead (Pb).

Next, in the preparation method of a copper green rust pigment according to an embodiment, a step of corroding the copper powder by mixing the copper powder with a corrosive agent containing sodium chloride and ammonium chloride is performed.

The preparation method of a copper green rust pigment according to an embodiment is a method of manufacturing Dongrok, a copper green rust pigment, by corroding a copper powder with a chlorine corrosion method using a chlorine compound as a corrosive agent.

The corrosive agent comprises sodium chloride and ammonium chloride, characterized in that it comprises 75 to 90 weight % of sodium chloride and 10 to 25 weight % of ammonium chloride based on the total weight.

This is to manufacture a copper green rust pigment with a Hayeob color using the corrosive agent. When the copper powder is corroded with a corrosive agent containing sodium chloride and ammonium chloride, the greenness of the manufactured pigment increases as the content of sodium chloride increases. When the sodium chloride is included in less than 75 weight % and the ammonium chloride is included in more than 25 weight %, the blueness of the prepared pigment increases, resulting in a problem of not exhibiting a green color. On the other hand, when the sodium chloride is included in more than 90 weight % and more than 95 weight %, and the ammonium chloride is included in less than 10 weight % and less than 5 weight %, there is a problem that the copper powder is not properly corroded.

Accordingly, in order to manufacture a copper green rust pigment having a green color similar to or the same as the color of Hayeob, it is preferable to include 75 to 90 weight % of the sodium chloride and 10 to 25 weight % of the ammonium chloride based on the total weight of the corrosive agent. It may be more preferable to include 86 to 90 weight % of the sodium chloride and 10 to 14 weigh % of the ammonium chloride based on the total weight of the corrosive agent.

In the step of corroding the copper powder, the copper powder and the corrosive agent are preferably mixed in a weight ratio of 1:2 or higher, and more preferably mixed in a weight ratio of 1:2 to 1:4 or 1:2 to 1:3.

This is to improve the corrosion rate by the corrosive agent and the subsequent removal efficiency of the corrosive agent. If the corrosive agent is included in an amount less than that of the copper powder, the corrosion rate by the corrosive agent is slow, so that the manufacturing time for the pigment may be too long or the copper powder may not be properly corroded. If the corrosive agent is included in an amount more than three times that of the copper powder, the amount of the corrosive agent remaining after completion of the corrosion is large, and thus a large amount of energy may be consumed in an additional process for removing the corrosive agent.

At this time, the corrosion may be carried out naturally in an atmospheric atmosphere, but it is preferable to perform artificial corrosion using a corrosion tester in consideration of corrosion efficiency.

For example, in the step of corroding, the copper powder and the corrosive agent may be mixed in a weight ratio of 1:2, and corroded for a total of 72 hours (9 cycles of 8 hours each) by an artificial corrosion method.

The preparation method of a copper green rust pigment according to an embodiment of the present invention may further include a step of pulverizing and wet fractionating the corrosion product prepared in the step of corroding.

The pulverizing is performed to improve the color uniformity of the manufactured pigment by reducing the particle size of the corrosion product to 100 μm or less.

The pulverizing can be performed using any method without limitation as long as the method can pulverize the powder, and for example, can be performed using a mortar mill.

In addition, the fractionating is performed to classify the powder pulverized to 100 μm or less based on particle size. For example, it can be classified into three groups: 45 μm or less, 45 μm to 75 μm, and 75 μm to 100 μm.

The fractionating is preferably a wet fractionating, and can be preferably performed by a wet sieving method using distilled water. Through this, it has the advantage of classifying pigments by particle size and at the same time removing residual corrosive agents.

In addition, the preparation method of a copper green rust pigment according to an embodiment of the present invention may further include a step of removing the residual corrosive agent by mixing the pulverized and wet fractionated powder with distilled water and removing the supernatant.

This step is to reduce the content of the residual corrosive agent in the pigment prepared by pulverizing and wet fractionating to 10 ppm or less. By removing the residual corrosive agent in the pigment through the above step, the stability of the pigment can be further improved by preventing further corrosion from being caused by the residual corrosive agent.

As an example, the above step can be performed by mixing the target pigment with distilled water, allowing it to stand still, and then removing the supernatant.

In addition, the preparation method of a copper green rust pigment according to an embodiment of the present invention may further include a step of purifying the powder from which the residual corrosive agent has been removed.

During the pigment manufacturing process, white, gray, or brown fine powders may be generated in the step of pulverizing, and it is preferable to remove these fine powders because they float on the surface during painting and can lower the chroma of green.

Accordingly, the step of purifying is a step for removing the fine powders in the pigment, specifically, the fine powders less than 5 μm.

The step of purifying may be performed on the pigment powder having a small particle size classified in the step of fractionating, and may be specifically performed by the elutriation method.

At this time, the elutriation method is a method of mixing the pigment with distilled water and then leaving it to stand to remove the supernatant of distilled water to remove the fine powders present in the supernatant.

As an example, the purification process according to the elutriation method can be carried out separately in the first and secondary stages. The first stage is carried out by putting the pigment in a 600 ml beaker, filling it with distilled water, mixing it, leaving it for 15 minutes, and removing the supernatant except for the precipitated particles. The secondary stage can be performed by mixing the decanted supernatant well, leaving it for 30 minutes, and then removing the supernatant except for the precipitate.

Thereafter, a purified pigment can be obtained by drying the precipitate at 60° C. for 24 hours using a dryer.

In another aspect of the present invention, the present invention provides a copper green rust pigment that is prepared using the preparation method above.

The copper green rust pigment is a green pigment for traditional Dancheong coloring.

Since the pigment is similar or identical to the traditional Dancheong Hayeob pigment analyzed in the actual cultural heritages site in terms of color, physical properties and components, it has the advantage of being able to replace the Hayeob pigment.

Hereinafter, the present invention will be described in detail by the following examples and experimental examples.

However, the following examples and experimental examples are only for illustrating the present invention, and the contents of the present invention are not limited thereto.

Materials

Among the methods of manufacturing a copper green rust pigment confirmed through old literature records, the materials used in the chlorine corrosion method of reacting the copper powder with chlorine compounds are copper powder and corrosive agents such as sodium chloride and ammonium chloride. Although a copper powder is presented as the main material in the literature, there are not many literature records related to the chlorine corrosion method, and considering the difficulty of manufacturing a copper powder, a copper plate along with the copper powder can be used as a material for research on the manufacturing method.

(1) Copper Powder

On the other hand, it is highly likely that copper utensils, which were commonly used in daily life, were used as a source of copper for the production of a copper green rust pigment in the past. Copper utensils, commonly used after the Three Kingdoms period, are made of bronze or brass, which are representative copper alloys. Bronze is composed of copper (Cu), tin (Sn) and lead (Pb), while brass is composed of copper (Cu) and zinc (Zn). Bronze and brass were widely used in everyday objects such as vessels and spoons, as well as in utensils used in ancestral rites and decorative items, and the proportions of the main components varied depending on the purpose of use, production method, and material supply and demand.

The composition ratio of the main components of the copper powder used to manufacture the copper green rust pigment with the Hayeob color was selected based on the analysis results of bronze vessels, Bangjja ware, and Sangpyeong Tongbo among the excavated artifacts and the pigment analysis results of painting cultural heritages. The copper powders (CU, CS, CZ, CP, and CT) of Preparative Examples 1 to 5 were prepared by manufacturing pure copper or copper alloys in the ratio shown in Table 1 below through a domestic manufacturer. The prepared copper powders are shown in FIG. 1.

TABLE 1

| Preparative Example | Content (Weight %) | | | |
| --- | --- | --- | --- | --- |
| | Cu | Sn | Zn | Pb |
| Preparative Example 1(CU) | 100% | — | — | — |
| Preparative Example 2(CS) | 78% | 22% | — | — |
| Preparative Example 3(CZ) | 70% | — | 30% | — |
| Preparative Example 4(CP) | 80% | 10% | 10% | — |
| Preparative Example 5(CT) | 85% | 5% | 5% | 5% |

(2) Corrosive Agents

According to the literature records, Kwangmyeong salt and Nyosa were used as corrosive agents that corrode copper powder. Kwangmyeong salt is a mineral salt of halogen compounds, and its main component is sodium chloride (NaCl), while Nyosa is natural ammonium chloride ($NH_4Cl$) found in volcanic or hot spring areas. To manufacture a copper green rust pigment having the Hayeob color by applying a chlorine corrosion method according to an embodiment of the present invention, 99.5% sodium chloride (SAMCHUN Chemical Co., Korea) and 99.0% ammonium chloride (SAMCHUN Chemical Co., Korea) were purchased from a domestic company and used. At this time, sodium chloride and ammonium chloride were mixed at the mixing ratios shown in Tables 2 and 3 below to prepare corrosive agents.

TABLE 2

| Preparative Example | Corrosive agent ratio | | Corrosive agent percentage (%) | | Corrosive agent (g) | |
| --- | --- | --- | --- | --- | --- | --- |
| | NaCl | $NH_4Cl$ | NaCl | $NH_4Cl$ | NaCl | $NH_4Cl$ |
| Preparative Example 6 (NA10) | 0 | 1 | 0 | 100 | 0 | 60 |
| Preparative Example 7 (NA01) | 1 | 2 | 33 | 67 | 20 | 40 |
| Preparative Example 8 (NA11) | 1 | 1 | 50 | 50 | 30 | 30 |
| Preparative Example 9 (NA21) | 2 | 1 | 67 | 33 | 40 | 20 |
| Preparative Example 10 (NA12) | 1 | 0 | 100 | 0 | 60 | 0 |

TABLE 3

| Preparative Example | Corrosive agent ratio | | Corrosive agent percentage (%) | | Corrosive agent (g) | |
| --- | --- | --- | --- | --- | --- | --- |
| | NaCl | $NH_4Cl$ | NaCl | $NH_4Cl$ | NaCl | $NH_4Cl$ |
| Preparative Example 11 | 3 | 1 | 75 | 25 | 45 | 15 |
| Preparative Example 12 | 4 | 1 | 80 | 20 | 48 | 12 |
| Preparative Example 13 | 5 | 1 | 83 | 17 | 50 | 10 |
| Preparative Example 14 | 6 | 1 | 86 | 14 | 51 | 9 |
| Preparative Example 15 | 9 | 1 | 90 | 10 | 54 | 6 |
| Preparative Example 16 | 19 | 1 | 95 | 5 | 57 | 3 |

<Experimental Example 1> Pigment Preparation by Natural Corrosion

By the following method, the corrosive agent and the copper powder were mixed in a weight ratio of 2:1 and then naturally corroded to prepare a pigment, and the color during the natural corrosion process was confirmed. The results are shown in FIG. 2.

Pigment preparation method: The corrosive agent of Preparative Example 8 was mixed with each of the copper powders (CU, CS, CZ, CP, and CT) of Preparative Examples 1 to 5 in an amount of 200 weight % based on the weight of the copper powder, and then exposed to air at room temperature for 20 days to prepare a pigment.

Figure 2:
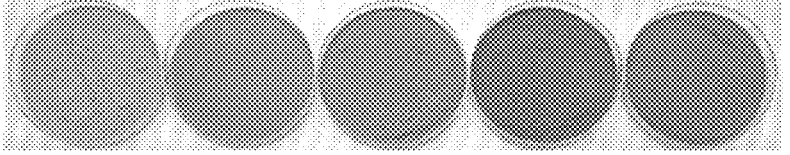
FIG. 2 is a set of photographs showing the results of observing the colors of the pigments prepared by naturally corroding the copper powders (CU, CS, CZ, CP, and CT) of Preparative Examples 1 to 5.

FIG. 2 is a set of photographs showing the color of the copper powder after naturally corroding a mixture obtained by mixing each of the copper powders (CU, CS, CZ, CP, and CT) of Preparative Examples 1 to 5 with the corrosive agent (NA11) of Preparative Example 8 for 0, 1, 3, 6, 10, 16, and 21 days.

As shown in FIG. 2, regardless of the type of copper powder, after 3 days, the color of all copper powders was changed entirely due to corrosion, and after 21 days, it was visually confirmed that the copper powder was completely corroded. The completely corroded pigment exhibited a blue color and did not exhibit the green color of Hayeob.

<Experimental Example 2> Pigment Preparation by Artificial Corrosion

By the following method, the corrosive agent and the copper powder were mixed in a weight ratio of 2:1 and then artificially corroded to prepare a pigment, and the color during the artificial corrosion process was confirmed. The results are shown in FIGS. 3 and 4.

Pigment preparation method: Each of the corrosive agents of Preparative Examples 6 to 10 (NA10, NA01, NA11, NA21, and NA12) was mixed with each of the copper powders (CU, CS, CZ, CP, and CT) of Preparative Examples 1 to 5 in an amount of 200 weight % based on the weight of the copper powder, and the mixture was artificially corroded according to KS standard KS D ISO 14993 (Corrosion of metals and alloys—Accelerated testing involving cyclic exposure to salt mist, dry and wet conditions). At this time, distilled water was sprayed in the spraying process during the corrosion tester operation, and a total of three cycles (24 hours, 1 day) with one cycle for 8 hours was performed to prepare a pigment.

Figure 4:
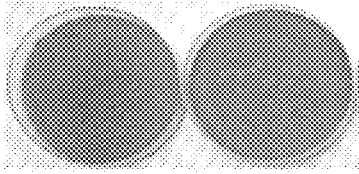
FIG. 4 is a set of photographs showing the results of observing the colors of the pigments after artificial corroding the copper powders (CU, CS, CZ, CP, and CT) of Preparative Examples 1 to 5 by mixing with a corrosive agent.
Figure 5A:
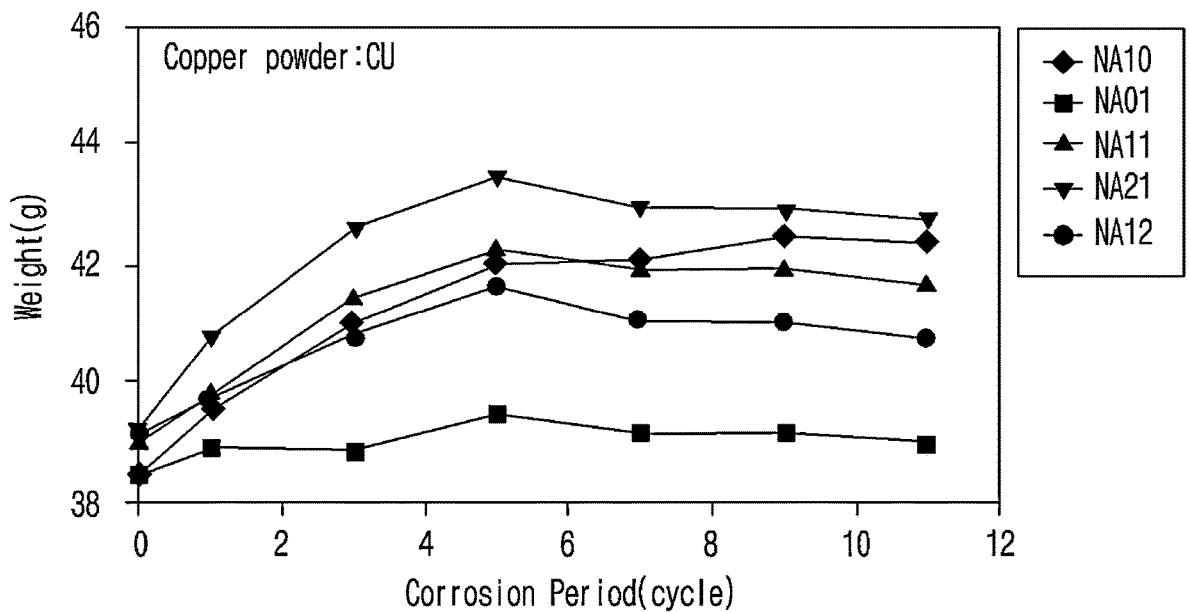
FIG. 5A is a set of graphs showing the results of evaluating the weight changes according to the period of artificial corrosion of the copper powders CU of Preparative Examples 1 to 5.
Figure 5B:
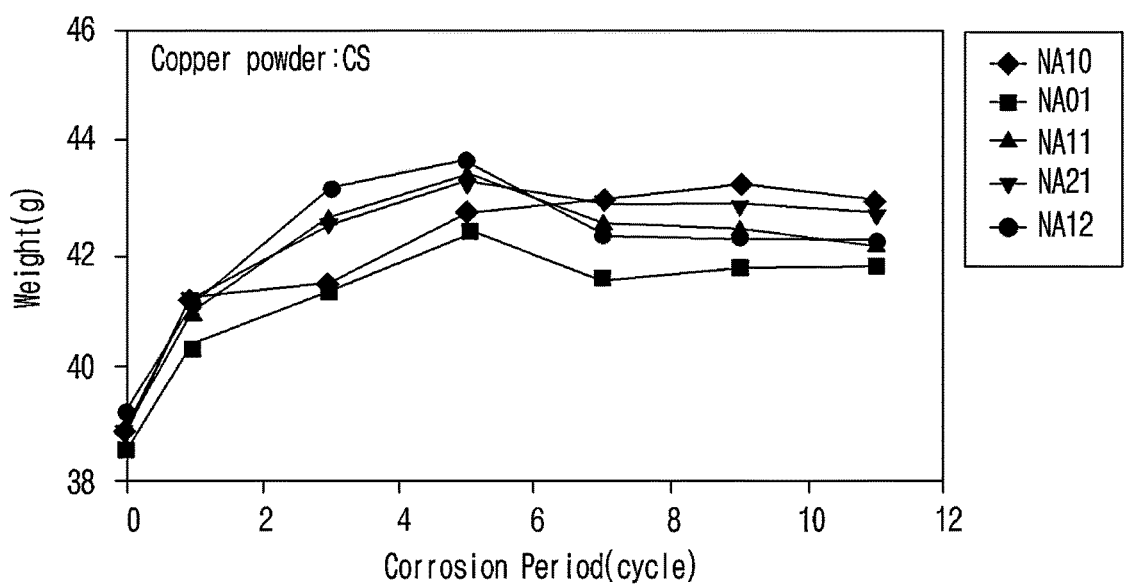
FIG. 5B is a set of graphs showing the results of evaluating the weight changes according to the period of artificial corrosion of the copper powders CS of Preparative Examples 1 to 5.
Figure 5C:
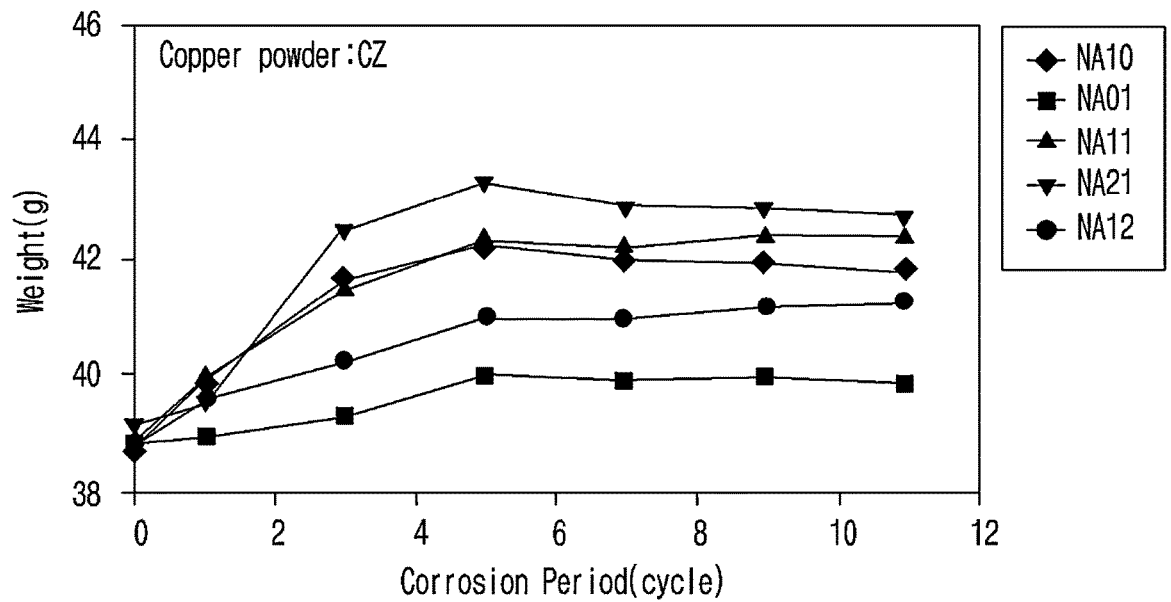
FIG. 5C is a set of graphs showing the results of evaluating the weight changes according to the period of artificial corrosion of the copper powders CZS of Preparative Examples 1 to 5.
Figure 5D:
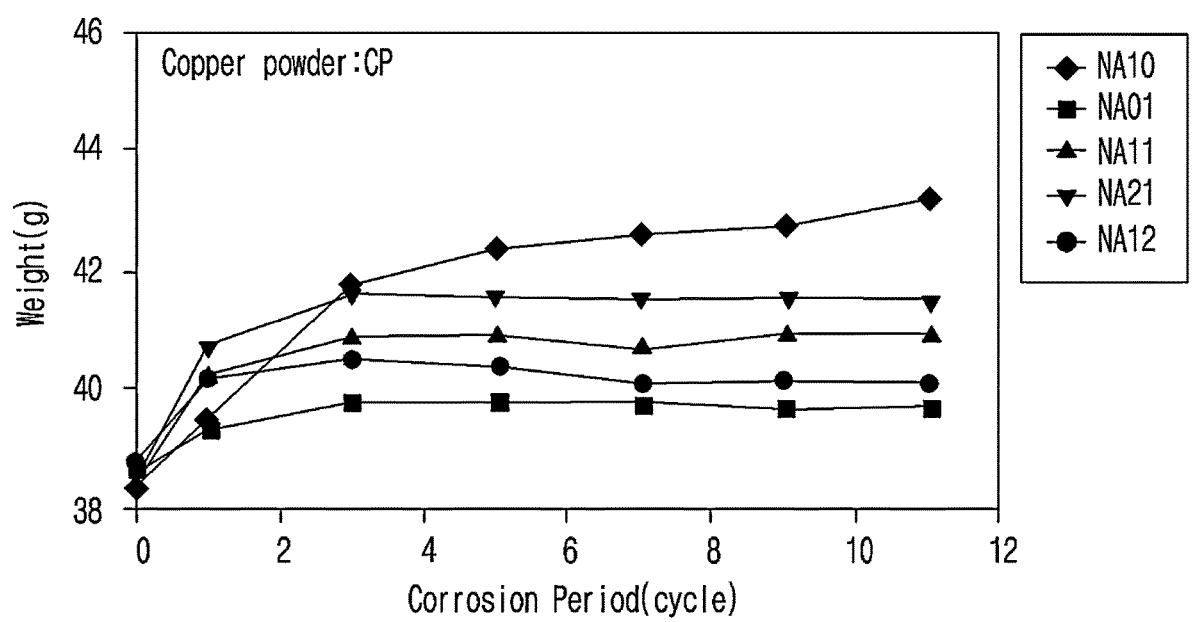
FIG. 5D is a set of graphs showing the results of evaluating the weight changes according to the period of artificial corrosion of the copper powders CP of Preparative Examples 1 to 5.
Figure 5E:
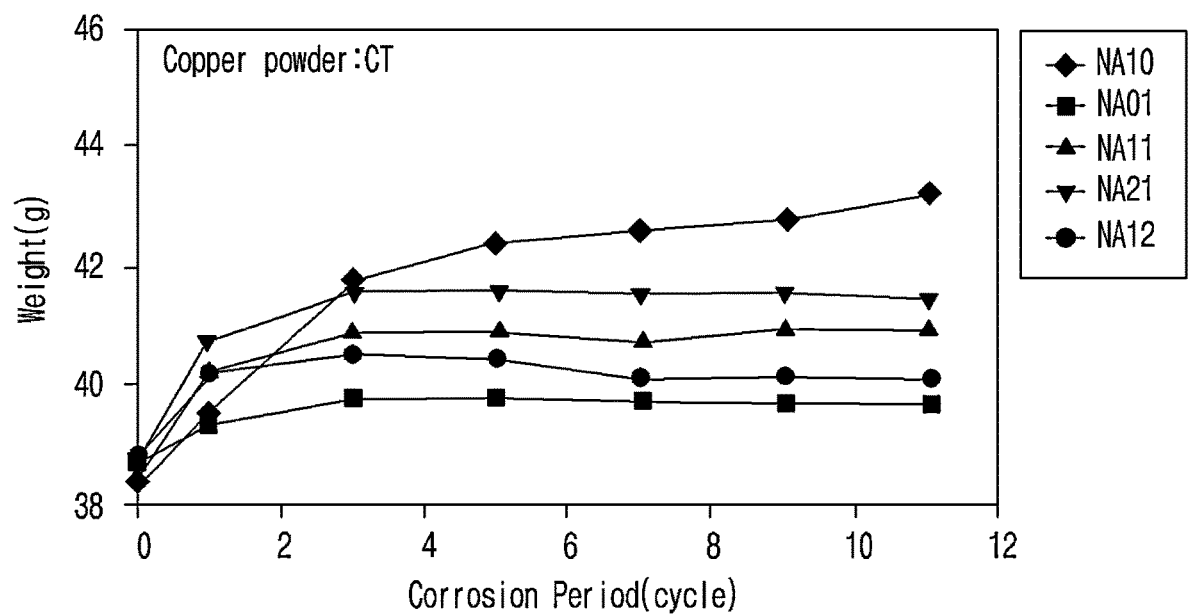
FIG. 5E is a set of graphs showing the results of evaluating the weight changes according to the period of artificial corrosion of the copper powders CT of Preparative Examples 1 to 5.

FIG. 3 is a set of photographs showing the colors of mixtures of the copper powder and the corrosive agent before artificial corrosion, and FIG. 4 is a set of photographs showing the colors after artificial corrosion for 1 day.

As shown in FIGS. 3 and 4, as a result of artificial corrosion, it was found that green or blue corrosion products were produced overall, except for the pigment produced by artificial corrosion by applying the corrosive agent (NA10) of Preparative Example 6.

In the case of natural corrosion, it was confirmed that the corrosion was completed after 21 days (see Experimental Example 1), whereas in the case of artificial corrosion, it was confirmed that the corrosion was completed in one day. From the above results, it can be concluded that the method using artificial corrosion is more suitable for the production of a copper green rust pigment in terms of efficiency of working time.

<Experimental Example 3> Evaluation of Corrosion Period

In order to set a corrosion period suitable for producing Dongrok, a copper green rust pigment having the Hayeob color by artificial corrosion using a corrosion tester, each of the corrosive agents (NA10, NA01, NA11, NA21, and NA12) of Preparative Examples 6 to 10 was mixed with each of the copper powders (CU, CS, CZ, CP, and CT) of Preparative Examples 1 to 5 and then artificially corroded in the same manner as in Experimental Example 2. A total of 11 cycles of artificial corrosion were performed on each of them, and the weight change of the copper powder according to the corrosion period was analyzed, and the results are shown in FIG. 5A to 5E. In addition, the color change was analyzed, and the results are shown in FIGS. 6 to 10.

FIG. 5A to 5E is a set of graphs showing the weight changes according to the period of artificial corrosion of the copper powders (CU, CS, CZ, CP, and CT) of Preparative Examples 1 to 5. As a result of the analysis, in most conditions, the weight increased rapidly at the beginning of corrosion and tended to remain constant after about 5 cycles or rather decrease in weight.

FIGS. 6 to 10 are photographs showing the colors of the copper powders (CU, CS, CZ, CP, and CT) of Preparative Examples 1 to 5 according to the artificial corrosion period.

As shown in FIG. 6, in the case of the copper powder (CU) of Preparative Example 1, as the artificial corrosion proceeded, the overall green product tended to increase. When the corrosive agent (NA10) of Preparative Example 6 was used, the sample was changed black and the state was maintained, so that the green color did not appear. In other conditions except for the condition of using the corrosive agent (NA10) of Preparative Example 6, the color was stable after 7 cycles, but in shape, it showed a more and more swelling up to 11 cycles.

As shown in FIG. 7, in the case of the copper powder (CS) of Preparative Example 2, as corrosion progressed under all conditions, the blue color decreased and the number of samples changed to green tended to increase. Unlike other copper powders, it was found that a dark green oxide was produced under the conditions of using the corrosive agent (NA10) of Preparative Example 6. Overall, it showed a stable corrosion form after 7 cycles.

As shown in FIG. 8, in the case of the copper powder (CZ) of Preparative Example 3, a bluish corrosion product was produced as a whole. Under the conditions of using the corrosive agent (NA10) of Preparative Example 6, only a little blue corrosion product was produced, but the overall state was a dark red corrosive. Overall, a stable corrosion form was observed after 7 cycles, and under the conditions of using the corrosive agent (NA21) of Preparative Example 9, the swelling state was gradually increased.

As shown in FIG. 9, In the case of the copper powder (CP) of Preparative Example 4, only a little green product was generated under the conditions of using the corrosive agent (NA10) of Preparative Example 6, but under other conditions, an overall green oxide was produced. As the corrosion progressed, the phenomenon of changing from blue to green was clearly observed, and overall, it showed a stable corrosion condition after 9 cycles.

As shown in FIG. 10, in the case of the copper powder (CT) of Preparative Example 5, except for the condition of using NA10, blue or green corrosion products were produced as a whole. Under the conditions of using the corrosive agents of Preparative Example 8 (NA11) and Preparative Example 9 (NA21), green corrosives were quickly produced, while under the conditions of using the corrosive agent (NA01) of Preparative Example 2, many blue corrosives remained. Overall, it showed a stable corrosion condition after 5 cycles.

From the above results, it was confirmed that the artificial corrosion period during which a stable copper green rust is produced through complete corrosion is at least 7 cycles or more (i.e., 56 hours or more), preferably 9 cycles or more (i.e., 72 hours or more).

<Experimental Example 4> Evaluation According to Corrosive Agent Ratio

After mixing each of the copper powders (CU, CS, CZ, CP, and CT) and each of the corrosive agents (mixtures of sodium chloride and ammonium chloride in a weight ratio of 0:1, 1:2, 1:1, 2:1 and 1:0) at a weight ratio of 1:2, artificial corrosion was performed in the same manner as in Experimental Example 2 for 7 cycles. The results are shown in FIG. 11.

Figure 11:
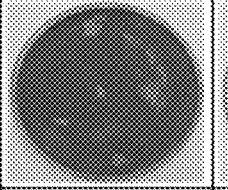
FIG. 11 is a set of photographs showing the results of observing the colors of the pigments prepared by artificial corrosion of the copper powders (CU, CS, CZ, CP, and CT) of Preparative Examples 1 to 5, wherein the ratio of sodium chloride and ammonium chloride in the corrosive agent is 0:1, 1:2, 1:1, 2:1, and 1:0.

As shown in FIG. 11, when the ratio of ammonium chloride in the corrosive agent increased, blue corrosion products were produced, and when the ratio of sodium chloride increased, green corrosion products tended to be produced. However, when there was no ammonium chloride at all, corrosion did not proceed smoothly. Accordingly, when using the corrosive agent of Preparative Example 9 containing sodium chloride and ammonium chloride in a weight ratio of 2:1, it was confirmed that the green color closest to the Hayeob color appeared.

On the other hand, a higher percentage of ammonium chloride will result in a more blue color. In order to confirm the optimal content ratio of sodium chloride and ammonium chloride to exhibit the Hayeob color, the copper powders (CU, CS, CZ, CP, and CT) of Preparative Examples 1 to 5 were artificially corroded (7 cycles) using the corrosive agents of Preparative Examples 11, 12, 15, and 16 containing sodium chloride and ammonium chloride in a weight ratio of 3:1, 4:1, 9:1, and 19:1 (contains 5, 20, and 25 weight % of ammonium chloride based on the total weight of the corrosive agent) to prepare pigments, and the color of each was confirmed. The results are shown in FIG. 12.

Figure 12:
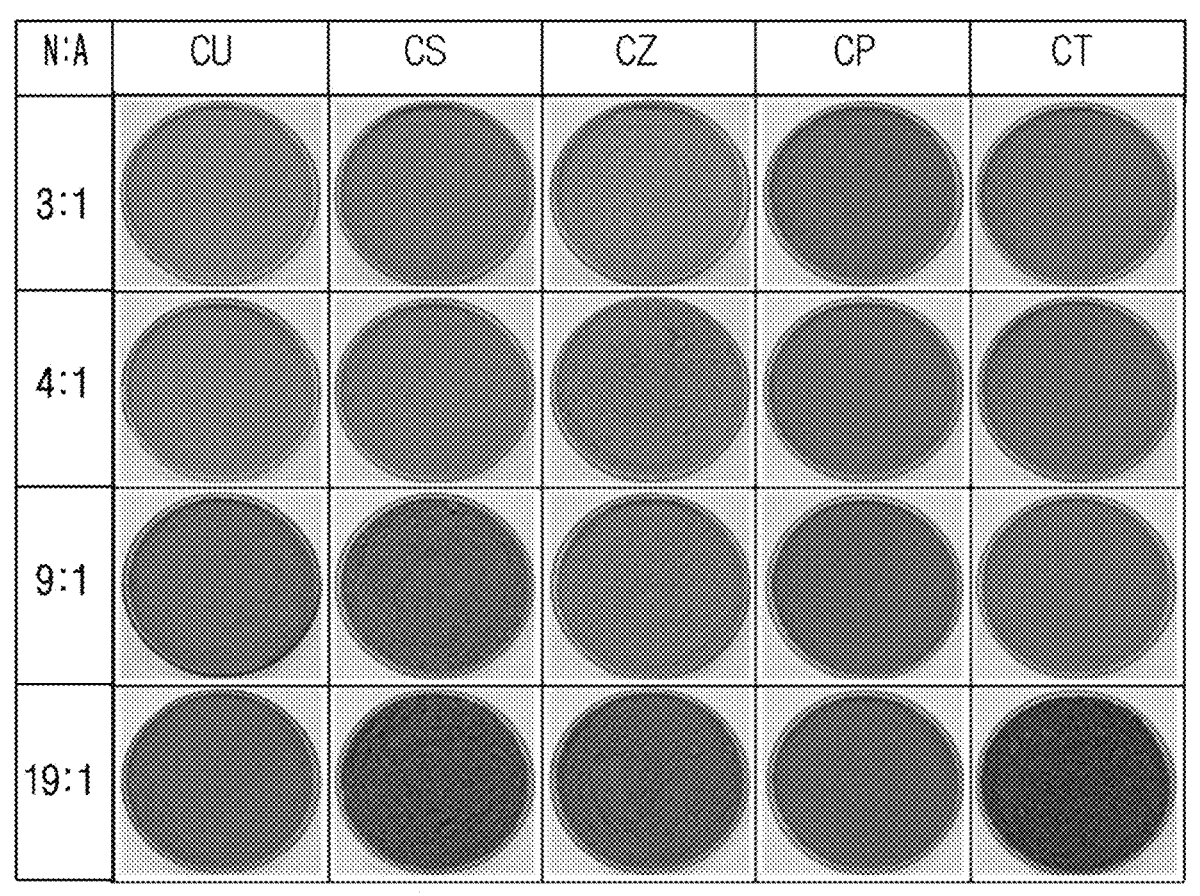

As shown in FIG. 12, in the case of the pigment prepared using the copper powder (CZ) of Preparative Example 3, as the ratio of sodium chloride increased, the blue color disappeared and a green corrosion product was produced, and in the case of other copper powders, the green color tended to become darker.

In addition, a large color change was observed in the pigment prepared using the corrosive agent of Preparative Example 16 (sodium chloride:ammonium chloride=19:1) among all pigments. To confirm this, each of the pigments was pulverized to a powder size of 100 μm or less using a mortar mill and sieved into 45 μm or less, 45 to 75 μm, and 75 to 100 μm by wet sieving using distilled water to analyze the color by size. The results are shown in FIG. 13.

Figure 13:
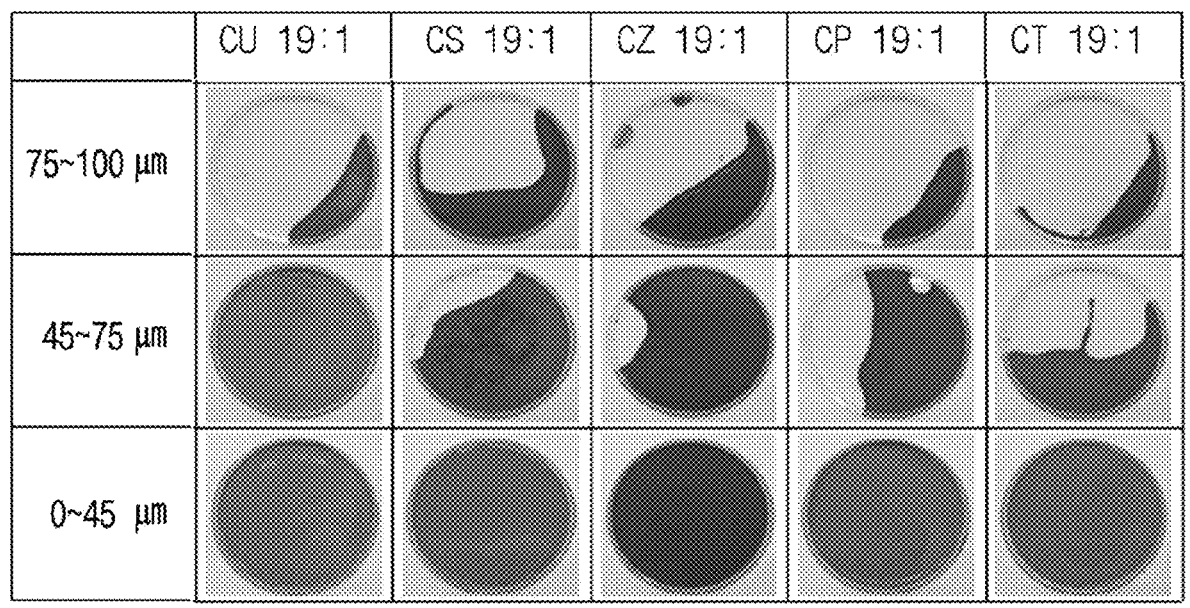
FIG. 13 is a set of photographs showing the results of observing the colors of the pigments prepared by artificial corrosion of the copper powders (CU, CS, CZ, CP, and CT) of Preparative Examples 1 to 5, wherein the ratio of sodium chloride and ammonium chloride in the corrosive agent is 19:1.

As shown in FIG. 13, in the case of using the corrosive agent of Preparative Example 16, a large difference in color was found according to the particle size range, and it was confirmed that there were many red or black corrosion products rather than green corrosion products.

From the above results, it was found that the green content increased as the proportion of sodium chloride in the corrosive agent increased, so a higher proportion of sodium chloride was suitable for manufacturing a copper green rust pigment having the Hayeob color, but if the proportion of sodium chloride was more than 95%, corrosion was not completely achieved, so it should be contained at most less than 95%.

Accordingly, the corrosive agent used to prepare a copper green rust pigment having the Hayeob color can include sodium chloride and ammonium chloride, wherein the sodium chloride is preferably included in an amount of 75 weight % to 95 weight %, more preferably in an amount of 86 weight % to 93 weight %, and most preferably in an amount of 90 weight % in order to make the Hayeob color appear in all 5 types of copper powder.

In addition, the ammonium chloride is preferably included in an amount of 5 weight % to 25 weight %, more preferably in an amount of 7 weight % to 14 weight %, and most preferably in an amount of 10 weight % in order to make the Hayeob color appear in all 5 types of copper powder.

<Experimental Example 5> Evaluation of Residual Corrosive Agent Removal Rate According to Wet Sieving Process In order to evaluate the removal rate of residual corrosive agents according to the wet sieving process after corrosion during the pigment manufacturing process, a mixture of the copper powder and the corrosive agent in a weight ratio of 1:2 (CU 3:1, 19:1 (CU copper powder, sodium chloride: ammonium chloride=3:1, 19:1), CP 3:1, 19:1 (CP copper powder, sodium chloride:ammonium chloride=3:1, 19:1)) was artificially corroded (7 cycles) by the method of Experimental Example 2. Then, the powder was pulverized to a size of 100 μm or less using a mortar mill and sieved into 45 μm or less, 45 to 75 μm, and 75 μm to 100 μm through wet sieving using distilled water. The discharged water was collected at the beginning, middle, and end of the wet sieving process, diluted 100 times to measure the concentration and redudction rate of chloride ions (Cl—) and the results are shown in FIGS. 14A and 14B, through this the change in the residual corrosive agent content during the wet sieving process was analyzed.

Figure 14A:
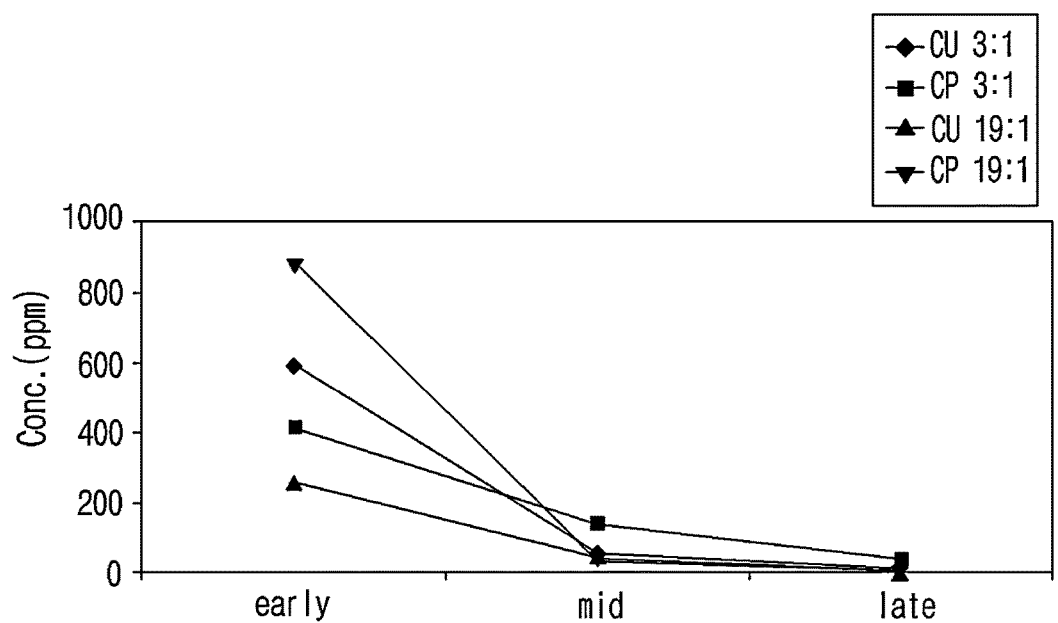
FIG. 14A is a graph showing the results of measuring the concentration of chlorine ions according to the wet sieving process in the preparation method of a copper green rust pigment of the present invention.
Figure 14B:
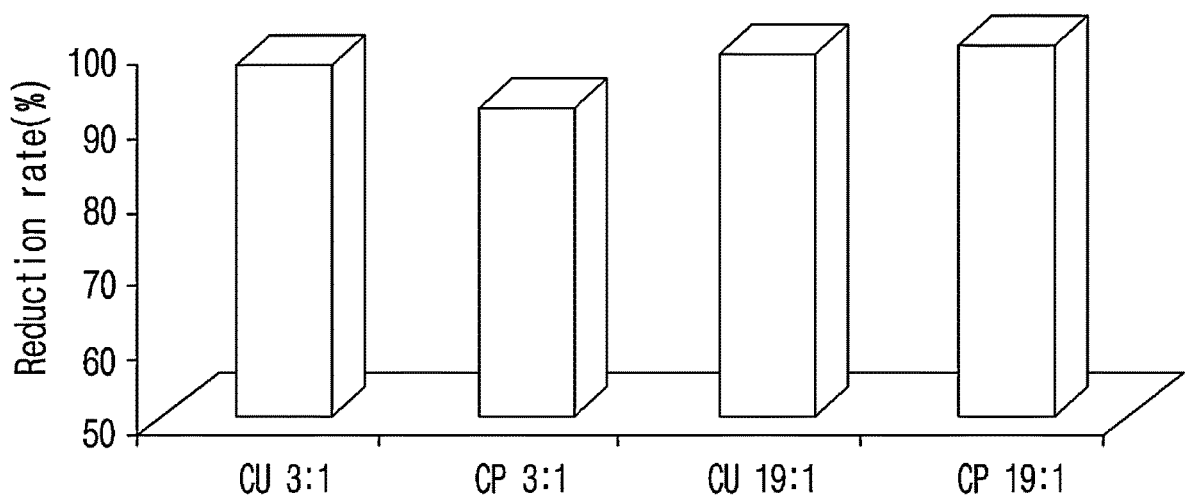
FIG. 14B is a graph showing the results of measuring the reduction rate of chlorine ions according to the wet sieving process in the preparation method of a copper green rust pigment of the present invention.

As shown in FIGS. 14A and 14B, as a result of the analysis, the initial chlorine ion concentration was 205 to 876 ppm, but in the latter half, it was 1.66 to 33.1 ppm, showing a decrease rate of about 91.9 to 99.1%. That is, it was confirmed that almost 90% or more of the residual corrosive agent was removed by wet sieving. However, the chlorine ion concentration was measured in water samples diluted 100 times, so additional dilution was required for the remaining corrosive agent in the corrosion product.

Figure 16A:
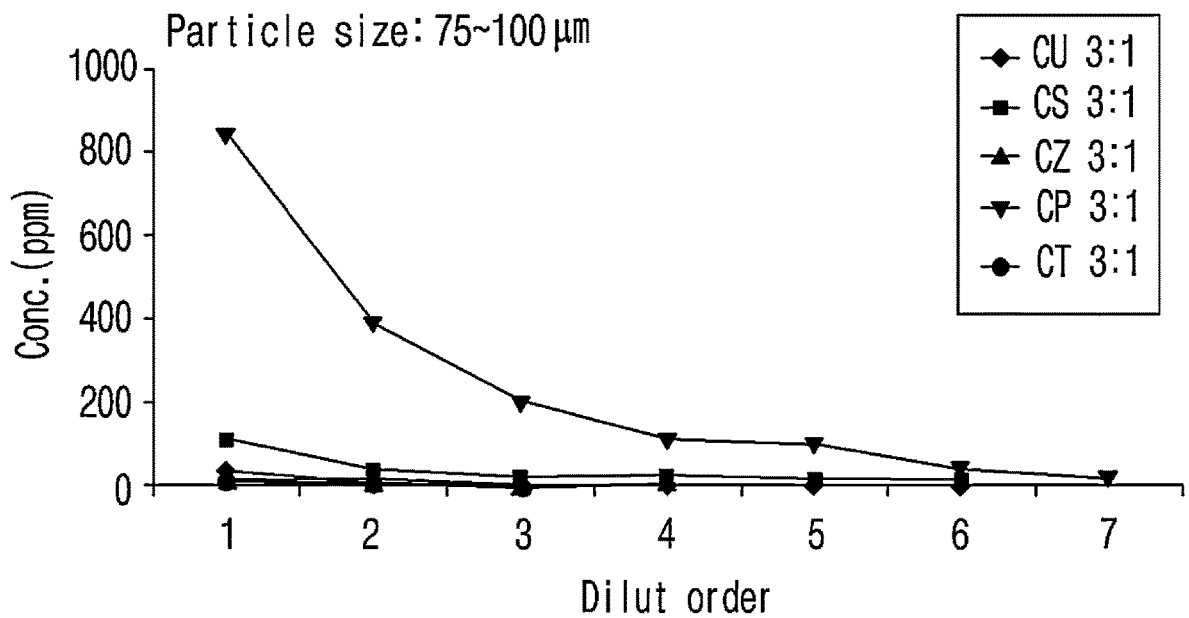
FIG. 16A is a graph showing the results of evaluating the residual corrosive removal rate for the pigment having a particle size of 75 to 100 μm in the dilution process in the preparation method of a copper green rust pigment of the present invention.
Figure 16B:
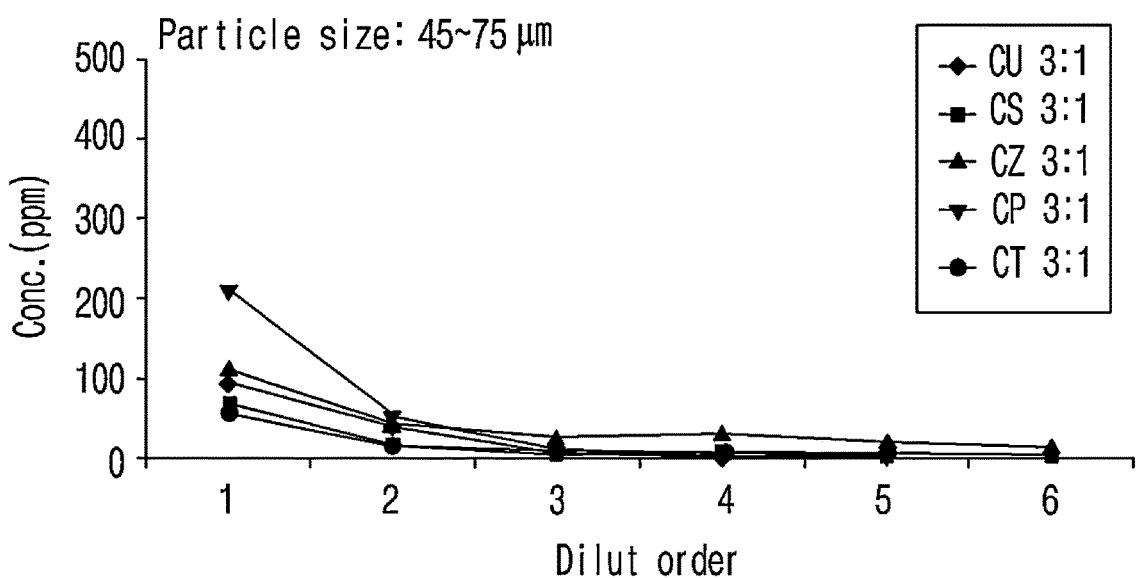
FIG. 16B is a graph showing the results of evaluating the residual corrosive removal rate for the pigment having a particle size of 45 to 75 μm in the dilution process in the preparation method of a copper green rust pigment of the present invention.
Figure 16C:
FIG. 16C is a graph showing the results of evaluating the residual corrosive removal rate for the pigment having a particle size of 0 to 34 μm in the dilution process in the preparation method of a copper green rust pigment of the present invention.

<Experimental Example 6> Evaluation of Residual Corrosive Agent Removal Rate According to Wet Dilution Process Although the removal of residual corrosive agents by wet sieving is very effective, the amount of residual corrosive agents is large in the range of 100 to 1000 ppm, so additional treatment is required to remove these residual corrosive agents. Accordingly, a dilution process was additionally performed for each particle size of the target pigment selected by wet sieving to evaluate the residual corrosive agent removal rate, and the results are shown in FIGS. 16A to 16C.

Each of the copper powders (CU, CS, CZ, CP, and CT) of Preparative Examples 1 to 5 and the corrosive agent of Preparative Example 11 (sodium chloride:ammonium chloride=3:1) were mixed in a weight ratio of 1:2, followed by artificial corroding (7 cycles) by the method of Experimental Example 2. Then, the powder was pulverized to a size of 100 μm or less using a mortar mill and sieved into 45 μm or less, 45 to 75 μm, and 75 μm to 100 μm through wet sieving using distilled water. The classified powder was used as the target pigment.

The dilution process was carried out by repeating distilled water exchange by mixing the target pigment with distilled water, standing it for a certain time, and then decanting the distilled water.

Figure 15A:
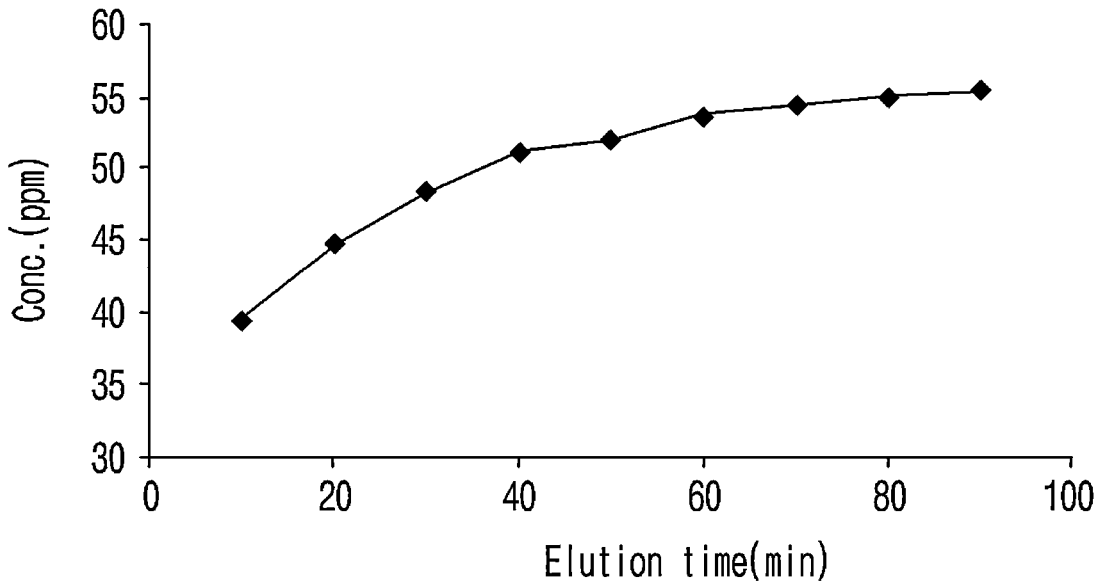
FIG. 15A is a set of graphs showing the results of evaluating the concentration of chlorine ions according to the elution time in the dilution process in the preparation method of a copper green rust pigment of the present invention.
Figure 15B:
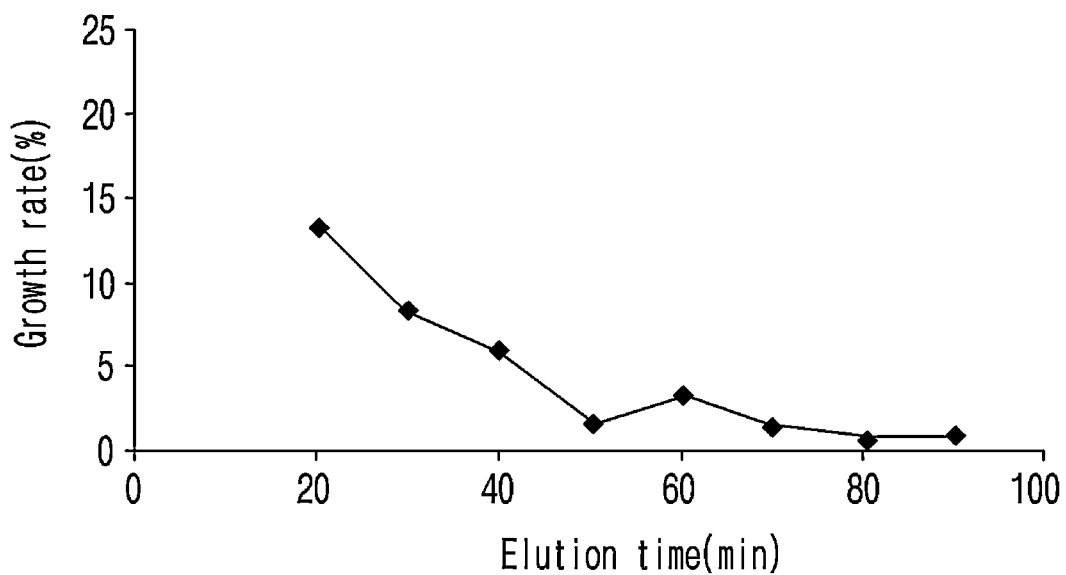
FIG. 15B is a set of graphs showing the results of evaluating the increase rate of chlorine ions according to the elution time in the dilution process in the preparation method of a copper green rust pigment of the present invention.

After mixing the pigment with distilled water in the dilution process, the corrosive agent in the pigment was eluted during the process of standing and removed together with distilled water. In order to improve the efficiency of the process of removing the corrosive agent, the elution time of the corrosive agent was measured, and the chlorine ion concentration and increase rate were measured every 10 minutes. As a result, as shown in FIGS. 15A and 15B, the chlorine ion concentration was increased rapidly in the early stage of the analysis and stabilized to some extent after 60 minute. As a result of analyzing the increase rate of chlorine ion concentration, the increase rate was 0.7% and 0.9% at 80 and 90 minutes, respectively, showing an increase rate of less than 1%. Based on the above results, the state in which the increase rate of the chloride ion concentration was maintained at 1% or less was regarded as reaching a constant weight, and the elution time of the corrosive agent was set to 90 minutes.

Based on the calculated elution time, the target pigment prepared by particle size was diluted. As a result, as shown in FIGS. 16A to 16C, in the case of second and third-stage pigments with large pigment particles, most of them were found to have chlorine ion concentration of 10 ppm or less after three to five dilutions. In the case of first-stage pigments with small pigment particles, it was confirmed that the chlorine ion concentration reached 10 ppm or less through seven to eight dilutions.

Through the above results, it was confirmed that the content of the corrosive agent in the pigment can be reduced to 10 ppm or less through the dilution process.

<Experimental Example 7> Color Evaluation According to Purification Process for Fine Powder Removal Pigments differ in color when they are in the powder state of the pigment itself and when they are actually painted using a sticking agent such as glue. Through wet sieving, pigments are classified into particles between 45 μm or less and 45 μm to 100 μm, and the manufactured pigments may have low chroma when actually painted using glue water. This is because white, gray or brown fine particles are generated in the process of grinding corrosive materials for pigment production, and these particles float to the surface when painting. Therefore, in order to improve the problem of low chroma of the manufactured copper green rust pigment, a purification process was added to remove the fine powder contained in the copper green rust pigment using the elutriation method.

The purification process is a process of removing fine particles using the elutriation method, and was performed on the pigments that were selected as particles of 45 μm or less during the wet sieving process.

Particularly, the purification process according to the elutriation method was carried out separately in the first and secondary stages. The first stage was carried out by putting the pigment in a 600 ml beaker, filling it with distilled water, mixing it, leaving it for 15 minutes, and removing the supernatant except for the precipitated particles. The secondary stage was performed by mixing the decanted supernatant well, leaving it for 30 minutes, and then removing the supernatant except for the precipitate. Thereafter, a purified pigment was obtained by drying the precipitate at 60° C. for 24 hours using a dryer.

The pigments that did not perform the purification process and the purified pigments were painted, and then the colors were compared. The results are shown in FIG. 17 (5S7C corrosion condition: corrosive agent NA 5:1, artificial corrosion 7 cycles/6S7C: corrosive agent NA 6:1, artificial corrosion 7 cycles).

Figure 17:
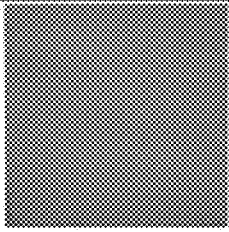
FIG. 17 is a set of photographs showing the comparison of pigment colors before and after the purification process in the preparation method of a copper green rust pigment of the present invention.

As shown in FIG. 17, it was confirmed that the green color of Hayeob was more pronounced when colored using the copper green rust pigment manufactured by performing the purification process.

Figures 18, 19:
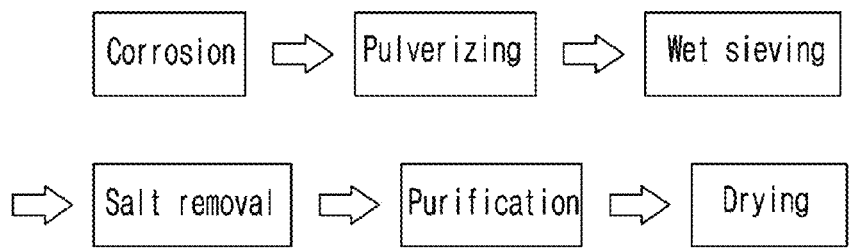
FIG. 18 is a diagram showing the process chart of the preparation method of a copper green rust pigment of the present invention.
FIG. 19 is a set of photographs showing the comparison of colors of the pigments prepared by varying the ratio of sodium chloride and ammonium chloride in the corrosive agent when the pigment was prepared by performing the preparation method of a copper green rust pigment of the present invention according to the process chart of FIG. 18.

Based on the above results, the preparation method of a copper green rust pigment having the Hayeob color according to an embodiment of the present invention can be performed in steps of corrosion, pulverizing, wet sieving, salt removal, purification, and drying, as shown in FIG. 18. More preferably, it may be performed by a method of performing the following processes. A copper powder comprising at least one of copper; and a copper alloy comprising copper and at least one of tin (Sn), zinc (Zn), and lead (Pb); and a corrosive agent containing sodium chloride and ammonium chloride were mixed in a certain ratio to corrode the copper powder. The corrosive agent was to include 75 to 95 weight % of the sodium chloride and 5 to 25 weight % of the ammonium chloride based on the total weight. Then, the corrosion product was pulverized and sorted, and a dilution process for removing residual corrosive agents and a purification process for removing fine particles were performed.

<Experimental Example 8> Evaluation According to Corrosive Agent Ratio (2)

As in Experimental Example 7, a copper green rust pigment was prepared by performing the steps of corrosion, pulverizing, wet sieving, salt removal, purification, and drying. As a corrosive agent, sodium chloride and ammonium chloride were used in different weight ratios of 3:1, 4:1, 5:1, 6:1, and 9:1. The color of the manufactured pigment was confirmed and the results are shown in FIG. 19, and the results of comparison with the traditional Dancheong Hayeob color selected by Dancheong experts are shown in FIG. 20.

Figure 20:
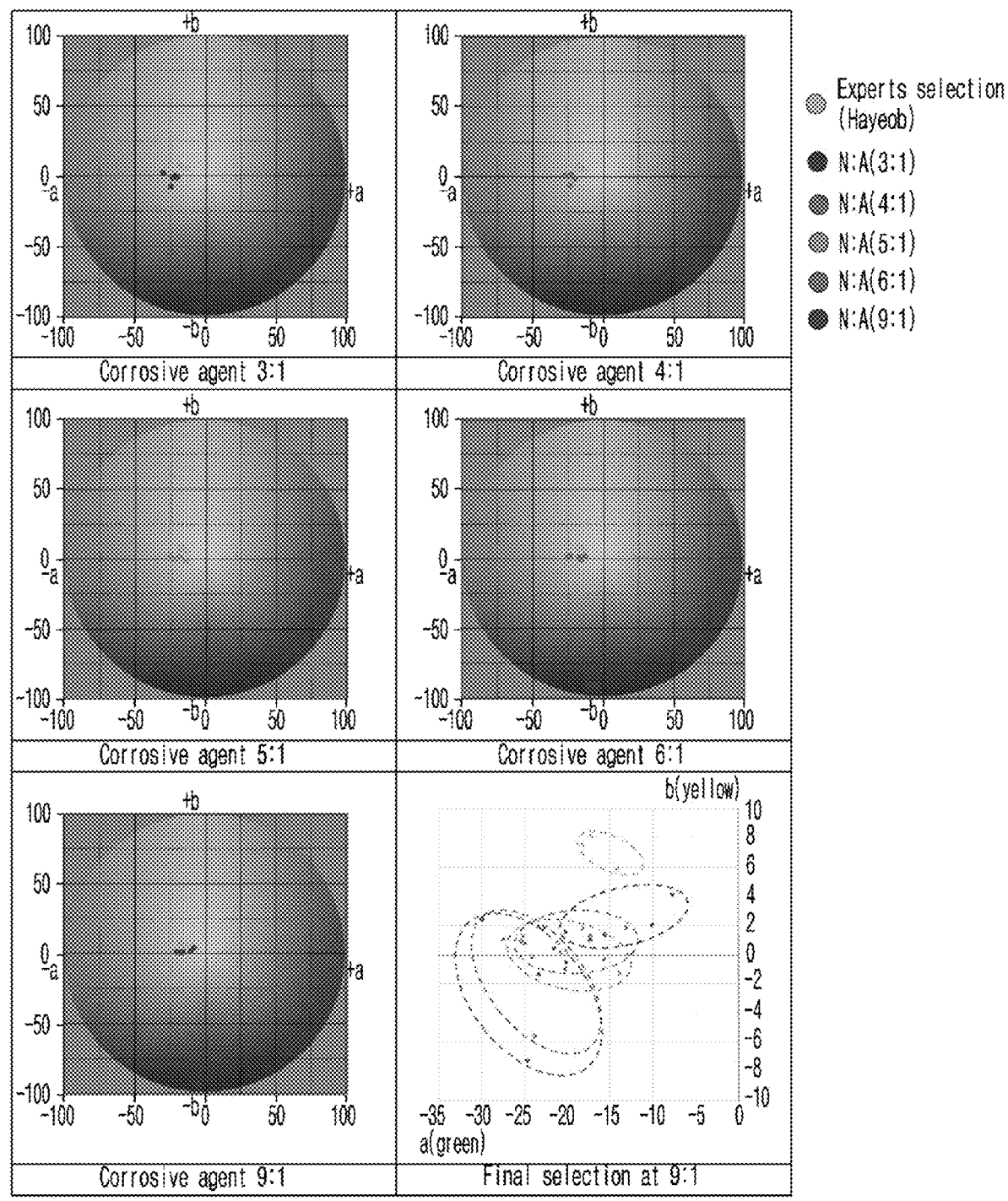
FIG. 20 is a set of graphs showing the results of evaluating the colors of FIG. 19 by comparing thereof with the color of Hayeob.

As a result of the color measurement in FIG. 19 and the evaluation result in FIG. 20, all five types of pigments produced showed green and greenish blue close to the Hayeob color. However, it was found that the case with the lowest ammonium chloride ratio of 10 weight % was closest to the Hayeob color.

Accordingly, the preparation method of a copper green rust pigment that can replace the traditional Dancheong Hayeob pigment can be performed most preferably by the method shown in Table 4 below.

TABLE 4

| | Process | Content | Condition |
|---|---|---|---|
| 1 | Corrosion | Artificial corrosion | Ratio of copper powder and corrosive agent (copper powder 1: corrosive agent 2) |
| | | using a corrosion tester | Corrosive agent mixing ratio (sodium chloride 9:ammonium chloride 1) |
| | | | Salt spray tester (CYP-90, SUGA, Japan) 9 cycles, 72 hours |
| 2 | Pulverizing | Pulverizing using a mortar mill | Less than 100 μm |
| 3 | Wet sieving | Wet sieving using distilled water | Less than 45 μ, 45~100 μm |
| 4 | Salt removal | Removal of residual corrosive agents by dilution method | 1 hour stirring and 1 hour precipitation, then supernatant removal, repeating 5 or more times |
| 5 | Purification | Removal of fine particles using elutriation method | First 15-minute precipitation, second 30-minute precipitation, then supernatant removal |
| 6 | Drying | Drying with a dryer | 60° C., 24 hours |

Specifically, the copper powder was mixed with twice the weight of the corrosive agent, and the corrosive agent in which sodium chloride and ammonium chloride were mixed in a ratio of 9:1 was used, and then artificial corrosion was performed using a corrosion tester. The corrosion was performed in 9 cycles (72 hours in total), and the corrosion product was pulverized to 100 μm or less using a mortar mill. The samples pulverized by sieving using distilled water through the wet sieving method were sorted into particles of 45 μm or less and 45 to 100 μm, and more than 90% of residual corrosive agents were removed in this process. Through a dilution process that repeats the process of removing the supernatant after stirring for 1 hour and precipitating for 1 hour more than 5 times, the corrosive agent contained in the pigment was removed to improve the coloring stability. Fine particles were removed through a purification process using the elutriation method to increase the chroma of the pigment. The final pigment was prepared through a drying process of drying at 60° C. for 24 hours using a dryer.

<Experimental Example 9> Evaluation of Color and Yield of Prepared Copper Green Rust Pigment Green pigments were prepared by the method shown in Table 5 using the five types of copper powders of Preparative Examples 1 to 5. According to the particle size of each copper powder, it was divided into M (45~100 μm) and S (45 μm or less) (S is a state in which fine particles have been removed by a purification process from particles of 45 μm or less). Two types of pigments were prepared for each copper powder to manufacture a total of 10 types of copper green rust pigments. The color and yield of the 10 prepared pigments were confirmed, and the results are shown in FIGS. 21 and 22.

Figure 21:
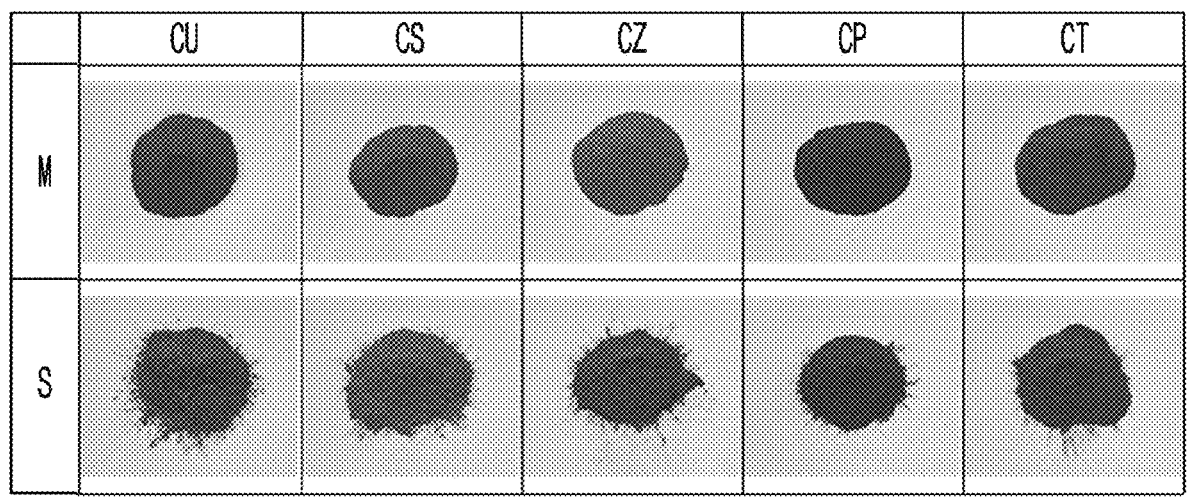
FIG. 21 is a set of photographs showing the green pigment prepared by the preparation method of a copper green rust pigment of the present invention.

As shown in FIG. 21, all of the prepared copper green rust pigments were generally bright green to dark green, indicating the Hayeob color, and the pigments with large particle sizes showed relatively dark colors.

Figure 22:
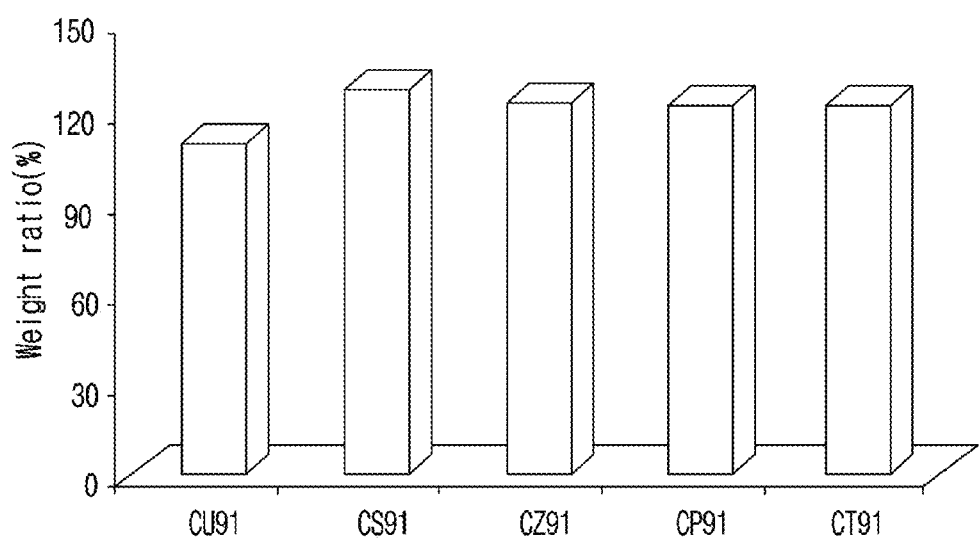
FIG. 22 is a graph showing the yield of the green pigment prepared by the preparation method of a copper green rust pigment of the present invention.

As shown in FIG. 22, about 60 g of a copper powder was used at a time to manufacture a copper green rust pigment, and 4 sets were manufactured at a time, 241 to 243 g of the copper powder was used overall, and 267 to 299 g of the copper green rust pigment was manufactured, resulting in a yield of 110.7 to 123.6%.

<Experimental Example 10> Evaluation of Physical Properties of Prepared Copper Green Rust Pigment Chromaticity, particle size distribution, microstructure, and oil absorption were measured for 10 types of the copper green rust pigments prepared in Experimental Example 8, and the results are shown in FIGS. 23 to 27.

Figure 23A:
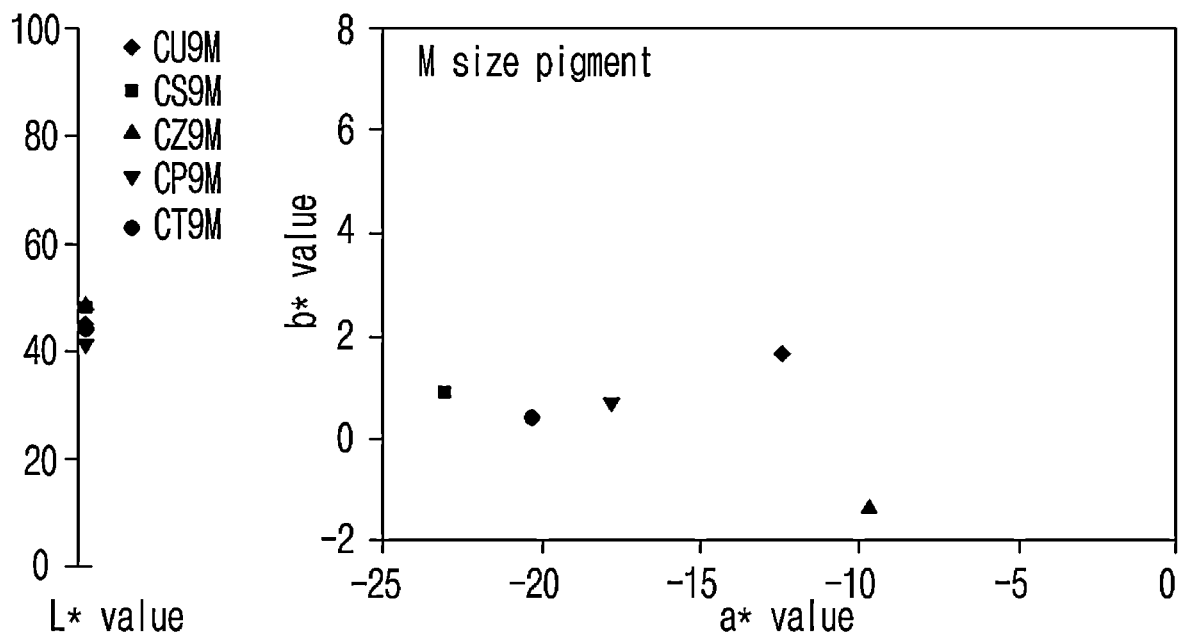
FIG. 23A is a set of graphs showing the chromaticity of the M-size green pigment prepared by the preparation method of a copper green rust pigment of the present invention.
Figure 23B:
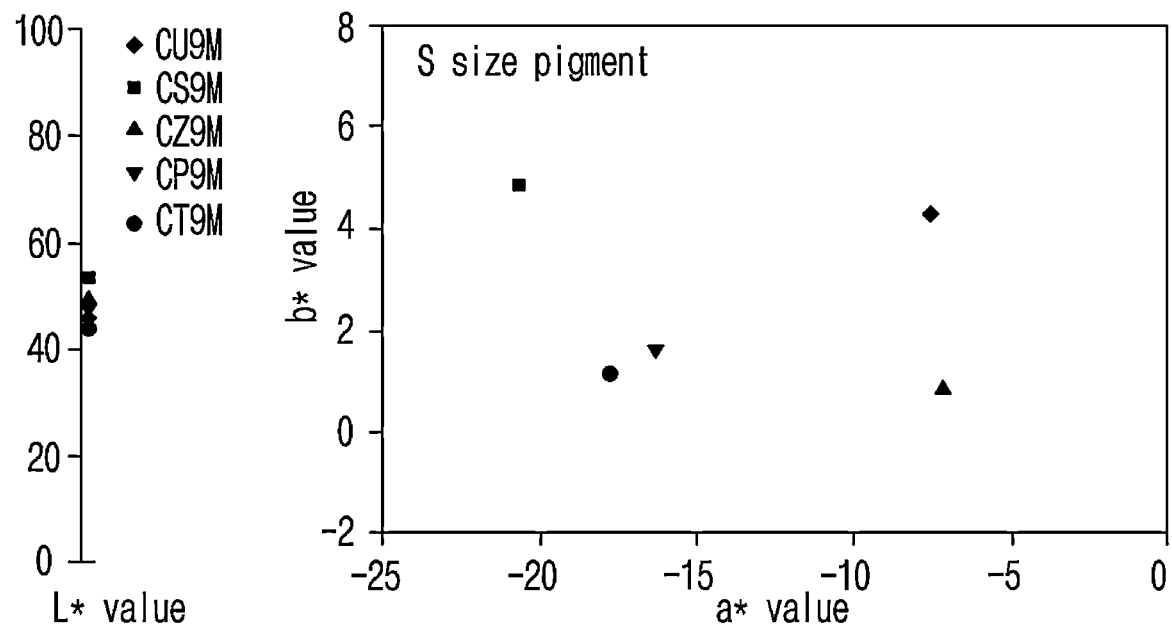
FIG. 23B is a set of graphs showing the chromaticity of the S-size green pigment prepared by the preparation method of a copper green rust pigment of the present invention.

FIGS. 23A and 23B are a set of graphs showing the results of measuring the chromaticity for 10 types of the prepared pigments. As shown in FIG. 23A, the M size copper green rust pigments showed a* values of −9.71 to −23.05, b* values of −1.35 to 1.64, and L* values of 40.84 to 48.97. And as shown in FIG. 23B, The S size copper green rust pigments showed a* values of −7.61 to −20.76, b* values of 0.90 to 4.95, and L* values of 43.33 to 53.24. Overall, the brightness (L*) and greenness (−a*) of the S size copper green rust pigments were higher than the M size copper green rust pigments, but the blueness (b*) was relatively low. Depending on the type of copper powder, the greenness of CS, CP, and CT was higher than that of CU and CZ, and the greenness of CS was the highest.

Figure 24:
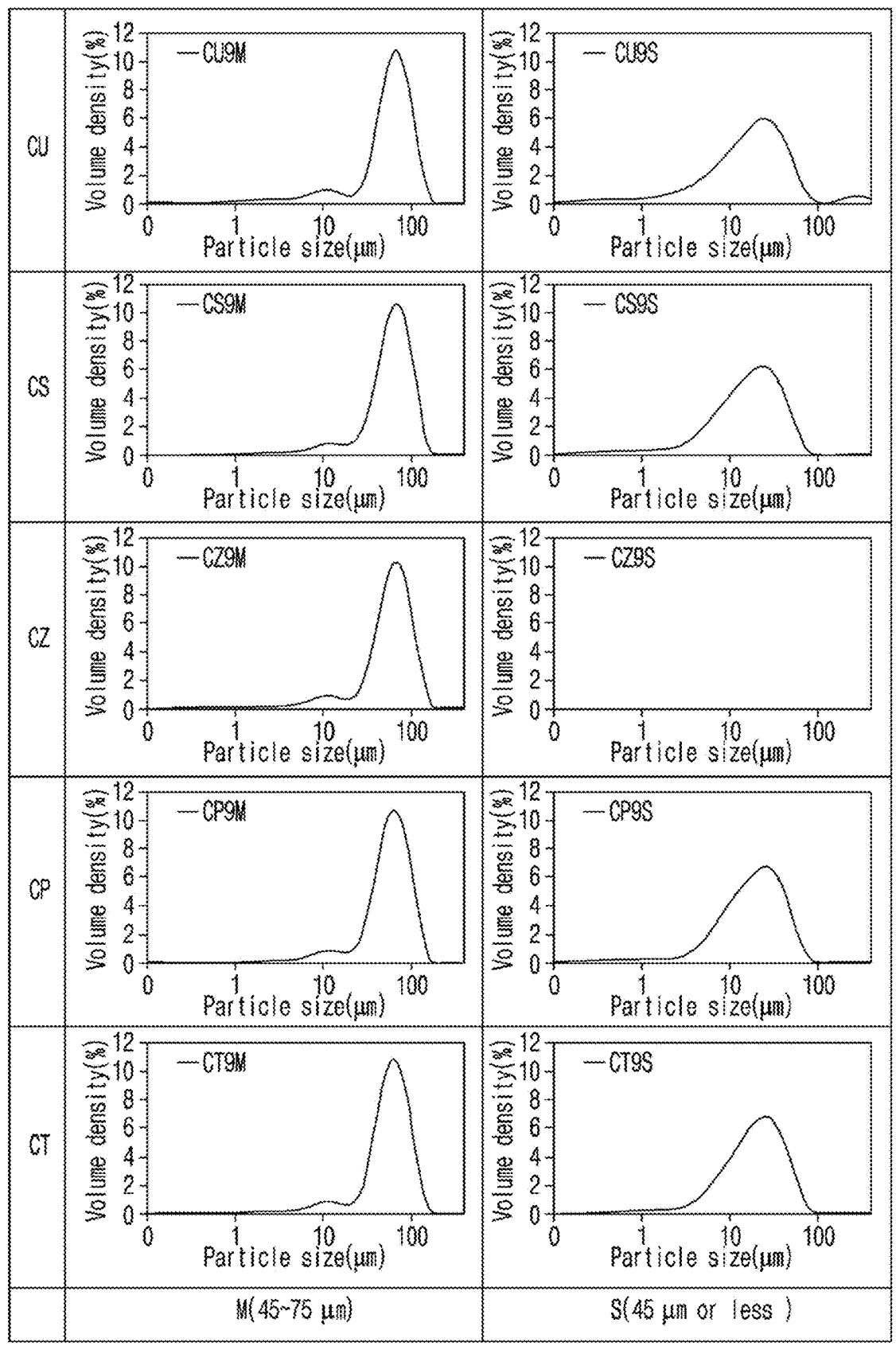
FIG. 24 is a set of graphs showing the particle size distribution of the green pigment prepared by the preparation method of a copper green rust pigment of the present invention.

FIG. 24 is a set of graphs showing the results of measuring the particle size distribution for 10 types of the prepared pigments. As shown in FIG. 24, overall, a similar distribution pattern was shown regardless of the type of copper powder under 100 μm. The M size copper green rust pigment with large particles showed a relatively narrow normal distribution with a particle size of 66.9 μm as the center, and showed an average particle size of 63.0~66.9 μm. The S size copper green rust pigment with small particles showed a shape close to normal distribution centered on the particle size of 21.2 μm, but it was slightly spread with a relatively large number of particles less than 10 μm, and showed an average particle size of 19.6~29.4 μm. In the case of the S pigment prepared to 45 μm or less, particle size analysis showed that small particles of 5 μm or less accounted for less than 1% of each section, which is considered to be due to the removal of fine particles during the purification process.

Figure 25:
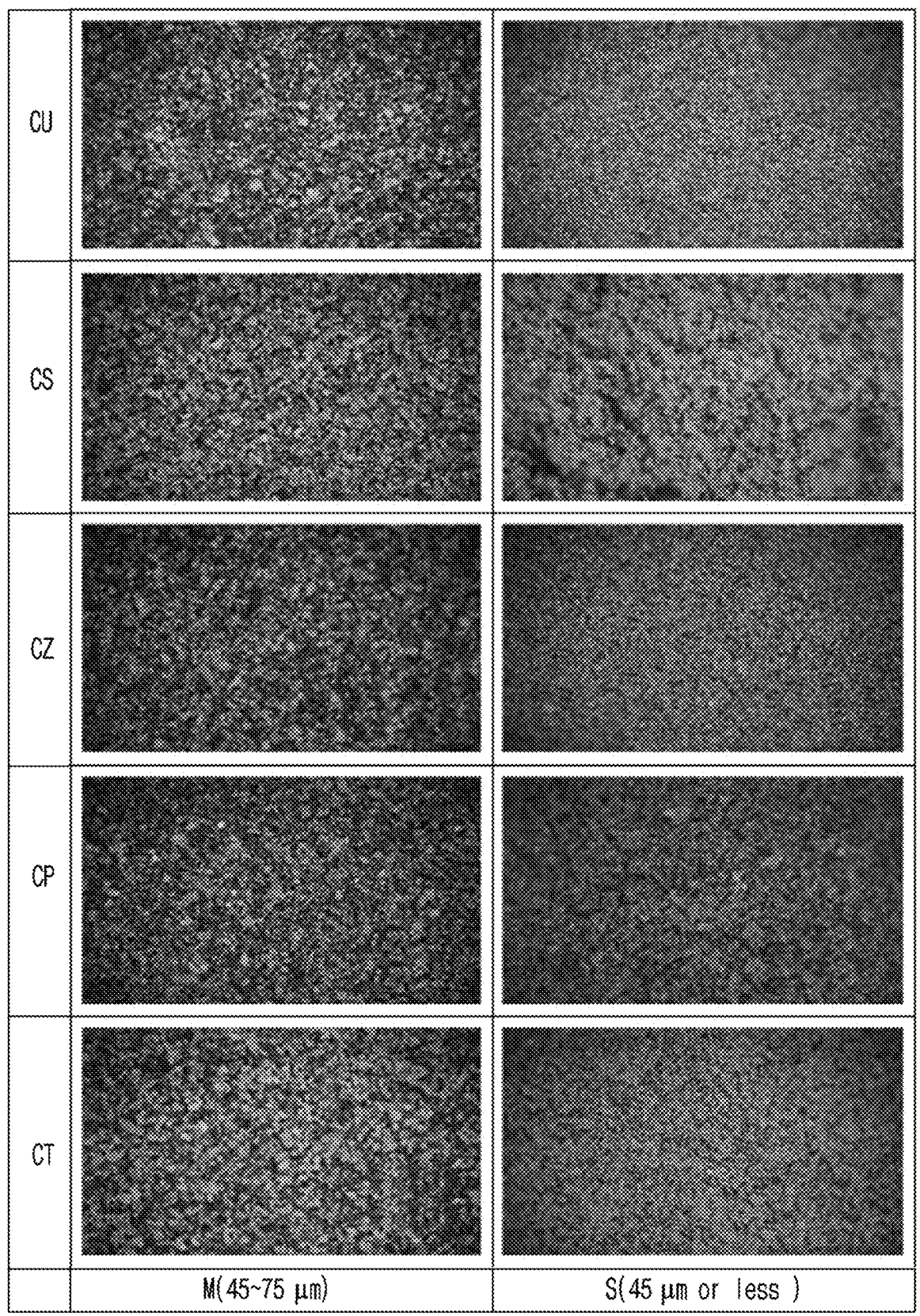
FIG. 25 is a set of photographs showing the results of observing the green pigment prepared by the preparation method of a copper green rust pigment of the present invention with a magnification microscope.
Figure 26:
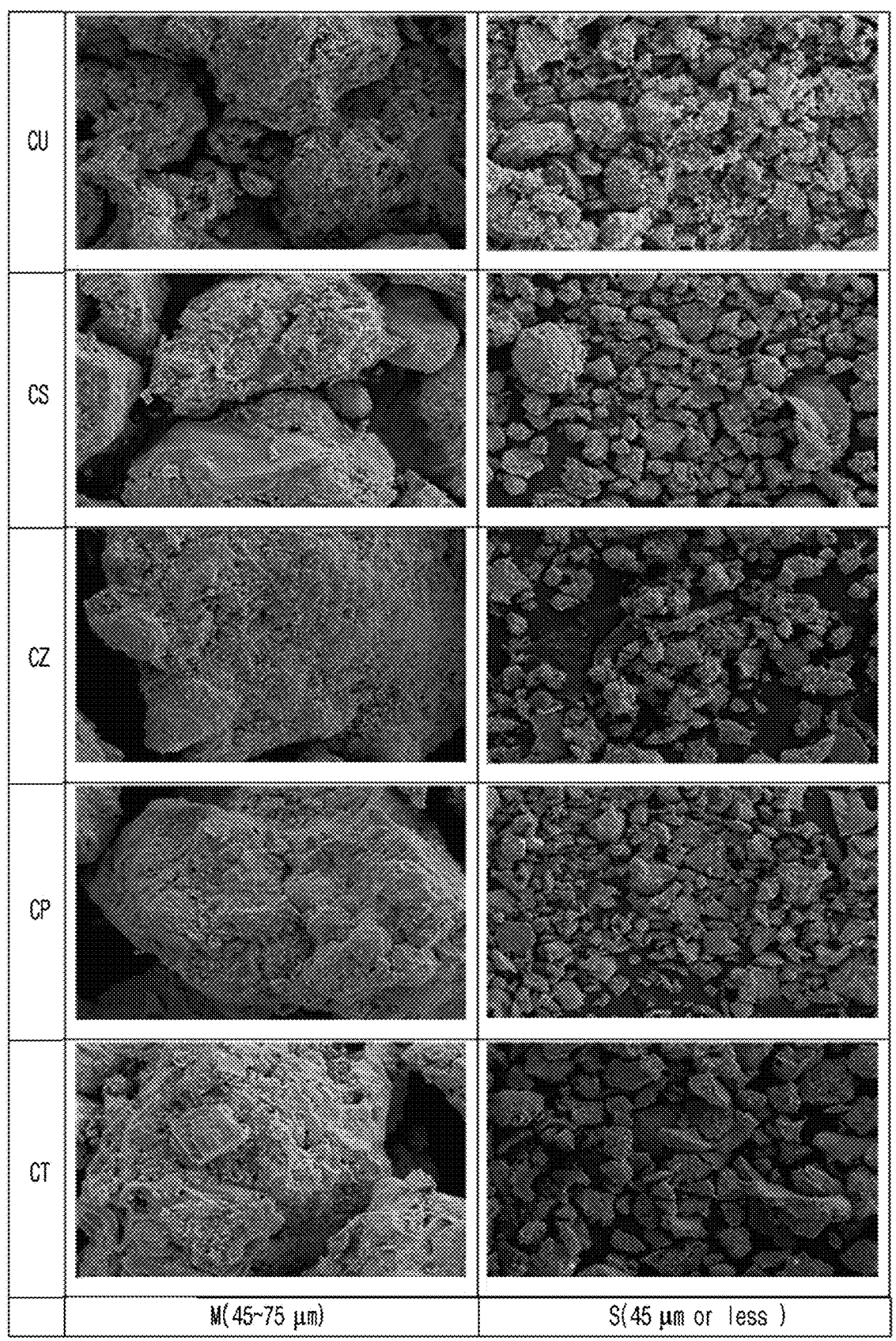
FIG. 26 is a set of photographs showing the results of observing the green pigment prepared by the preparation method of a copper green rust pigment of the present invention with a scanning electron microscope (SEM).

FIG. 25 is a set of photographs showing the results of observing the prepared 10 types of pigments with a magnification microscope, and FIG. 26 is a set of photographs showing the results of observing the pigments with a scanning electron microscope.

As shown in FIG. 25, as a result of the magnification microscope analysis, blue-green or green particles were observed in all 10 pigments, and dark red particles were present between the green particles. In particular, a large number of dark red particles were observed in the copper green rust pigment prepared with CU copper powder. This is considered to be due to the fact that the particles separated from the surface of the corrosion product are revealed in the process of pulverizing the corrosion product. This is likely due to the nature of the corrosion, where corrosion occurs from the surface of the raw material and once a corrosion layer is formed, there may be copper or copper oxide remaining inside that does not fully corrode. In the case of pure copper, this characteristic is stronger than that of an alloy in which tin, zinc, lead, and the like are mixed, so it is determined that there are relatively many dark red particles.

As shown in FIG. 26, as a result of FE-SEM analysis, 10 pigments had a rough surface of particles overall, a lot of porous elliptical particles were observed, and showed polygonal particle shapes, which was different from natural inorganic pigments that showed mineral-specific particle shapes.

Figure 27:
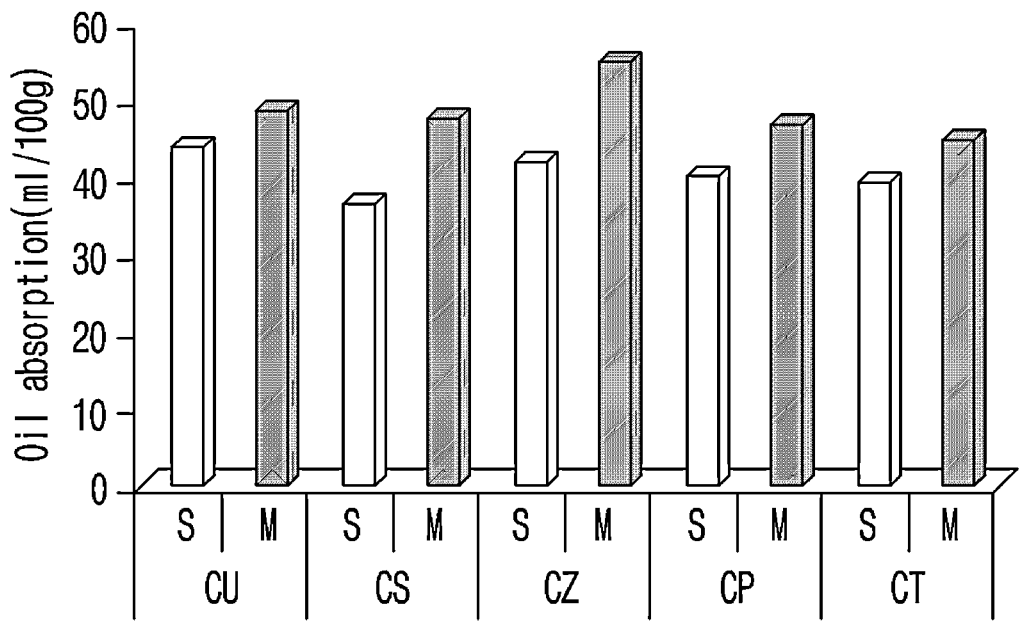
FIG. 27 is a graph showing the results of evaluating the oil absorption of the green pigment prepared by the preparation method of a copper green rust pigment of the present invention.

FIG. 27 is a graph showing the results of evaluating the oil absorption of the prepared 10 types of pigments. Oil absorption is one of the basic characteristics of pigments, and is affected by the particle shape, particle size, and particle size distribution, and is a standard for estimating the mixing ratio of sticking agents when using pigments.

The oil absorption of the copper green rust pigment was measured. As a result, as shown in FIG. 27, the M size pigment with a large particle size showed a relatively higher oil absorption than that of the S size pigment with a small particle size. The M size pigment showed an oil absorption of 44.82~54.97 ml/100 g, and the copper green rust pigment made of CZ showed the highest oil absorption. The S size pigment showed an oil absorption of 36.62~43.97 ml/100 g, and the copper green rust pigment made of CU showed the highest oil absorption.

<Experimental Example 11> Evaluation of Components of Prepared Copper Green Rust Pigment X-ray fluorescence analysis and X-ray diffraction analysis were performed to analyze the components of the 10 copper green rust pigments prepared in Experimental Example 8. The results are shown in FIGS. 28 and 29.

Figure 28:
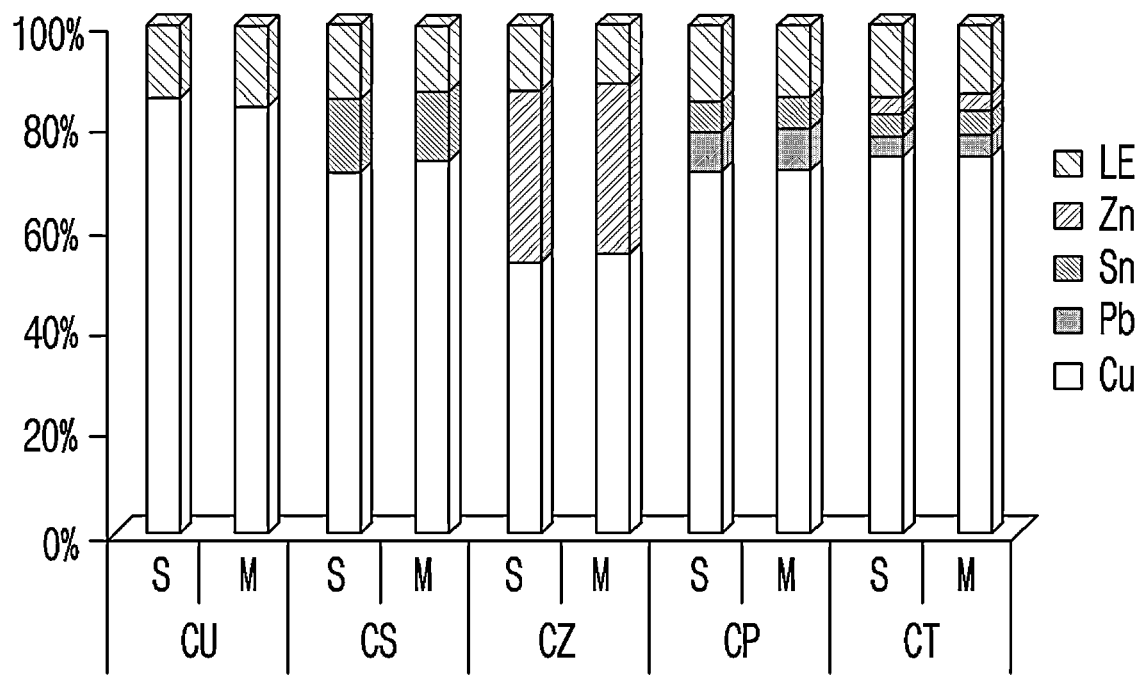
FIG. 28 is a graph showing the results of X-ray fluorescence analysis with the green pigment prepared by the preparation method of a copper green rust pigment of the present invention.

FIG. 28 is a graph showing the results of X-ray fluorescence analysis for the 10 pigments. As shown in FIG. 28, the constituent elements of the copper green rust pigment showed no significant difference between the S and M size pigments classified by particle size, and the main detected elements were copper (Cu), zinc (Zn), tin (Sn), and lead (Pb). Since it is a copper green rust pigment made of pure copper and a copper alloy containing tin, zinc, and lead, it is believed that the main elements were detected due to the influence of copper and the copper alloy, the raw materials.

Figure 29:
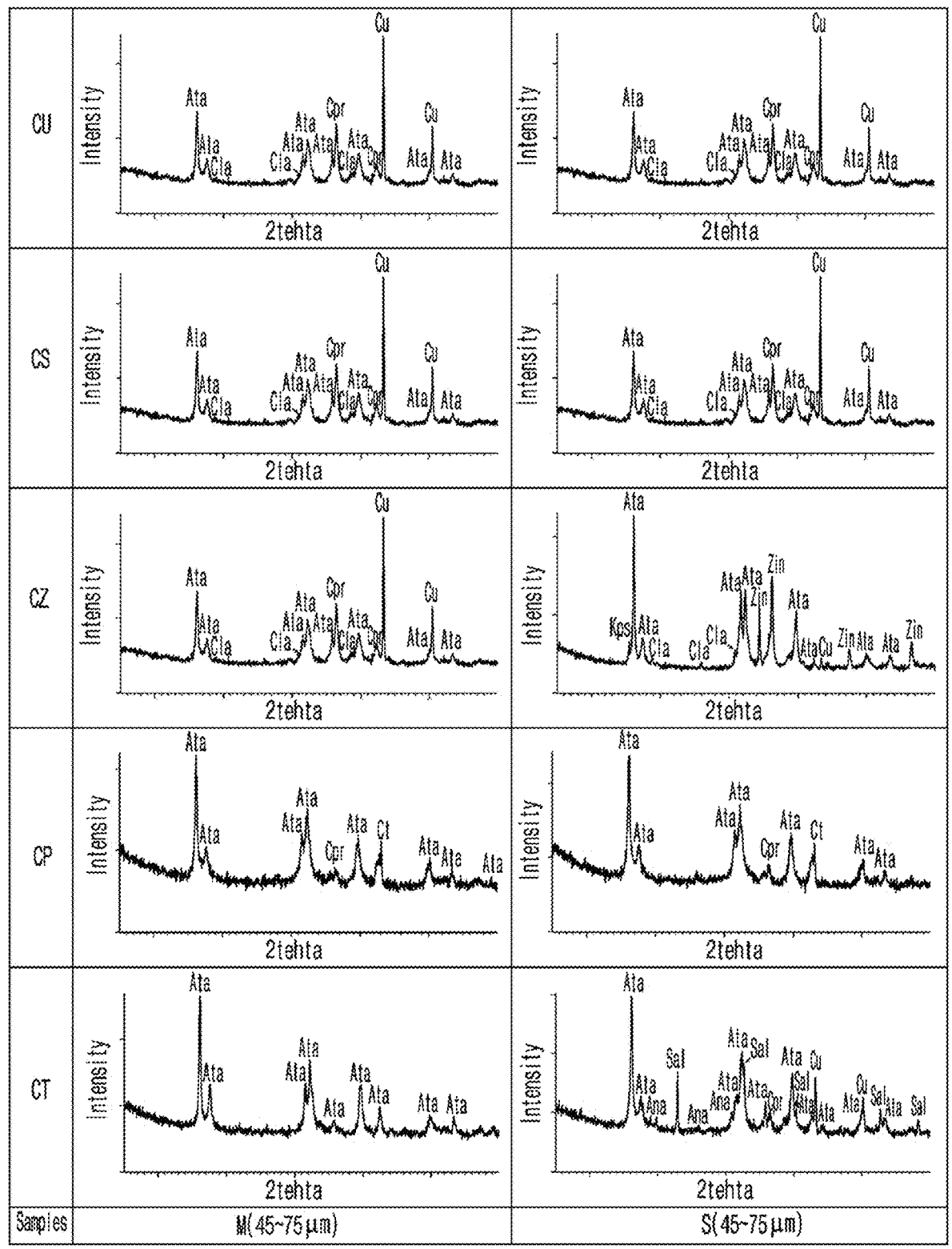
FIG. 29 is a set of graphs showing the results of X-ray diffraction analysis with the green pigment prepared by the preparation method of a copper green rust pigment of the present invention.

FIG. 29 is a set of graphs showing the results of X-ray diffraction analysis for the 10 pigments. As shown in FIG. 29, there was no significant difference between the M and S size pigments classified by particle size, and the main constituent mineral of the copper green rust pigment was identified as atacamite ($Cu_2Cl(OH)_3$). In addition, elements such as copper (Cu), tin (Sn), zinc (Zn), and lead (Pb) contained in the raw material copper powder were detected (Ata is Atacamite, Cla is Clinoatacamite, Cu is Copper, Cpr is Cuprite, Kps is Kapellasite, Zin is Zincite, Ana is Anatacamite and Sal is Salammoniac in FIG. 29).

<Experimental Example 12> Evaluation of Stability of Prepared Copper Green Rust Pigment An accelerated weathering test was performed to evaluate the stability of the copper green rust pigment. The stability was evaluated by measuring the chromaticity of the colored specimens at regular intervals in the accelerated weathering test process and calculating the color difference (ΔE) according to the cumulative UV irradiation amount. The results are shown in FIGS. 30 and 31.

Figure 30:
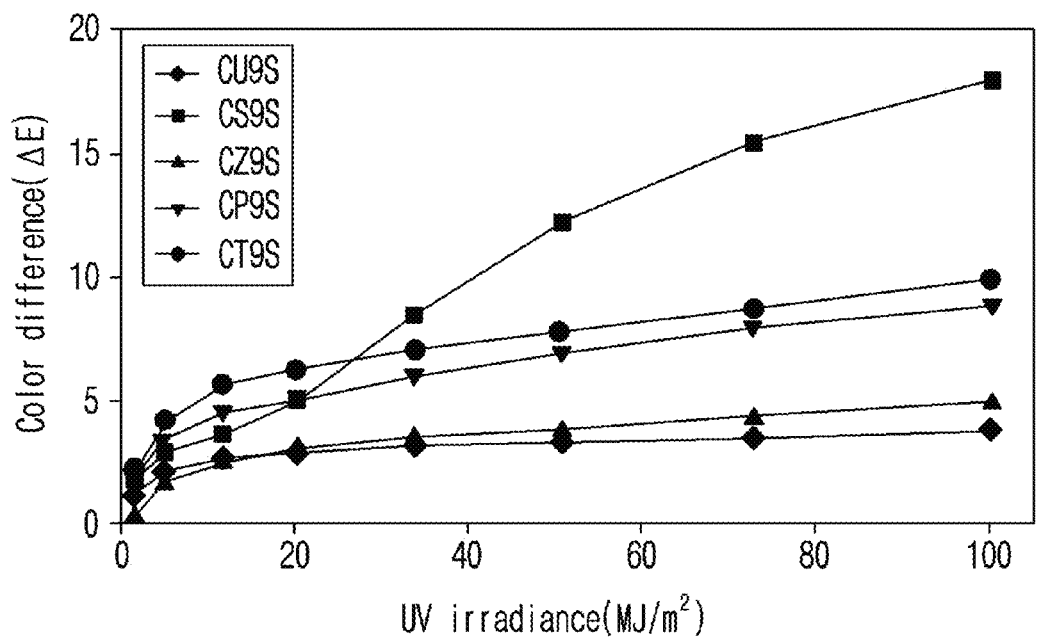
FIG. 30 is a graph showing the results of calculating the color difference (ΔE) according to the accumulated amount of UV irradiation on the pigment to evaluate the stability of the green pigment prepared by the preparation method of a copper green rust pigment of the present invention.

As shown in FIG. 30, CU, CZ, CP, and CT copper green trust pigments, excluding CS copper green trust pigments, showed a similar tendency. From the beginning of the test, the color difference increased rapidly until the UV irradiation amount of 11.9 $MJ/m^2$, and then gradually increased thereafter. In the case of CS copper green rust pigment, the color difference tended to increase rapidly from the beginning of the test to the end of the test. As a result, CU and CZ copper green rust pigments showed color difference values of 3.81 and 4.97, respectively, and showed relatively good color change, but CS, CP, and CT copper green rust pigments showed color difference values of 8 or higher, indicating relatively high color change.

Figure 31:
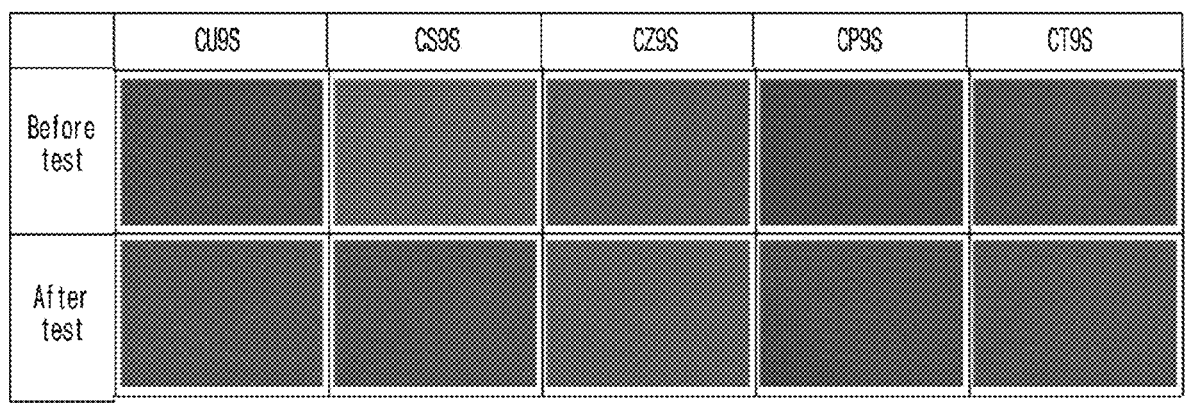
FIG. 31 is a set of photographs showing the comparison of colors before and after the accelerated weathering test to evaluate the stability of the green pigment prepared by the preparation method of a copper green rust pigment of the present invention.

In addition, when examining the color change of the copper green rust pigment before and after the stability evaluation test through FIG. 31, it was found that the color change from bluish green before the test to dark green as the yellowness increased after the test.

<Experimental Example 13> Comparative Evaluation with Traditional Dancheong Hayeob Pigment The copper green rust pigment prepared according to an embodiment of the present invention was compared with the Hayeob pigment estimated to be copper green rust pigment in traditional Dancheong.

Figure 32:
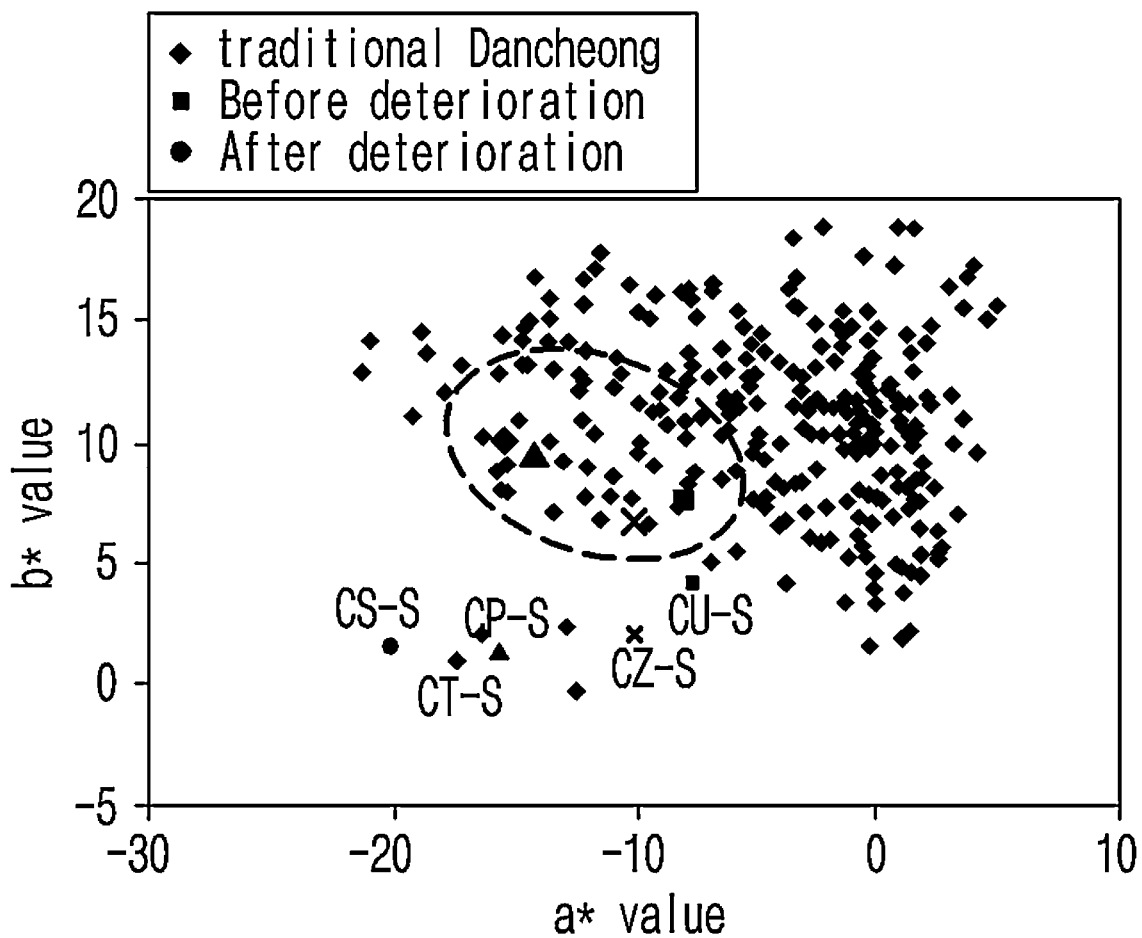
FIG. 32 is a graph showing the results of comparative evaluation of the chromaticity of the green pigment prepared by the preparation method of a copper green rust pigment of the present invention before and after deterioration and the chromaticity of the traditional Dancheong Hayeob pigment measured at the site of cultural heritages.

To compare the color of the traditional Dancheong pigment Hayeob with the color of the prepared copper green rust pigment, the results of the traditional Dancheong survey and the chromaticity before and after deterioration of the Dongrok pigment were compared, and the results are shown in FIG. 32.

As shown in FIG. 32, the prepared copper green rust pigment showed a similar value in greenness compared to the remaining Hayeob pigment, while the yellowness was significantly lower.

On the other hand, it was confirmed that the color of the copper green rust pigment after deterioration had a color similar to that of the Hayeob pigment of traditional Dancheong due to a significant increase in yellowness. The fact that the prepared copper green rust pigment, when deteriorated, exhibits a color similar to the Hayeob pigment of the traditional Dancheong that remains today is very encouraging for research on the reproduction of the traditional Dancheong pigment.

In addition, the results of the characteristic analysis of the prepared copper green rust pigment and the traditional Dancheong Hayeob pigment were compared. As a result, it was confirmed that the copper green rust pigment reproduced by the chlorine corrosion method using pure copper and copper alloy powders (5 types) had the same color and composition as the Hayeob of the traditional Dancheong in cultural heritages and similar particle shape.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

The invention claimed is:

1. A preparation method of a copper green rust pigment that can replace traditional Hayeob pigments comprising the following steps:
    a step of preparing a copper powder comprising at least one of copper and a copper alloy comprising copper and at least one of tin (Sn), zinc (Zn), and lead (Pb); and
    a step of corroding the copper powder by mixing the copper powder with a corrosive agent containing sodium chloride and ammonium chloride, in which the corrosive agent includes 75 to 90 weight % of the sodium chloride and 10 to 25 weight % of the ammonium chloride based on the total weight.

2. The preparation method of a copper green rust pigment according to claim 1, wherein the corrosive agent includes 86 to 90 weight % of the sodium chloride and 10 to 14 weight % of the ammonium chloride based on the total weight.

3. The preparation method of a copper green rust pigment according to claim 1, wherein the copper powder and the corrosive agent are mixed in a weight ratio of 1:2 to 1:4 in the step of corroding.

4. The preparation method of a copper green rust pigment according to claim 1, wherein the corrosion is performed by artificial corrosion using a corrosion tester.

5. The preparation method of a copper green rust pigment according to claim 1, wherein the preparation method further include a step of pulverizing and wet fractionating a corrosion product prepared in the step of corroding.

6. The preparation method of a copper green rust pigment according to claim 5, wherein the preparation method further include a step of removing a residual corrosive agent by mixing the pulverized and wet fractionated powder with distilled water and removing a supernatant.

7. The preparation method of a copper green rust pigment according to claim 6, wherein the preparation method further includes a step of purifying the powder from which the residual corrosive agent has been removed.

* * * * *